US011151815B2

(12) United States Patent
Suzuki et al.

(10) Patent No.: US 11,151,815 B2
(45) Date of Patent: Oct. 19, 2021

(54) KEY INFORMATION SHARING SYSTEM, DELIVERY DEVICE AND USER TERMINAL

(71) Applicant: TOYOTA JIDOSHA KABUSHIKI KAISHA, Toyota (JP)

(72) Inventors: Ryuichi Suzuki, Nagakute (JP); Yuki Ito, Iwakura (JP); Hiroyasu Shiokawa, Nagoya (JP); Yasumasa Kobayashi, Nagoya (JP); Naoki Yamamuro, Nagoya (JP); Makoto Akahane, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 57 days.

(21) Appl. No.: 16/185,229

(22) Filed: Nov. 9, 2018

(65) Prior Publication Data
US 2019/0147679 A1    May 16, 2019

(30) Foreign Application Priority Data
Nov. 13, 2017    (JP) .............................. JP2017-218503

(51) Int. Cl.
*G07C 9/00* (2020.01)
*B60R 25/00* (2013.01)
(Continued)

(52) U.S. Cl.
CPC ...... *G07C 9/00309* (2013.01); *B60R 25/2018* (2013.01); *B60R 25/2081* (2013.01);
(Continued)

(58) Field of Classification Search
CPC ........... G07C 2009/00349; G07C 2009/00793; G07C 2009/00865; G07C 2009/0088; G07C 9/00309; G07C 9/00571; G07C 9/00857; G07C 9/29; G07C 5/008; G07C 9/27; G07C 2209/04; G07C 2009/00261;
(Continued)

(56) References Cited

U.S. PATENT DOCUMENTS

| 8,943,187 B1 * | 1/2015 | Saylor |
| 9,646,165 B1 | 5/2017 | Saylor |

(Continued)

FOREIGN PATENT DOCUMENTS

| CN | 106408701 A | 2/2017 |
| JP | 2004-284460 A | 10/2004 |

(Continued)

*Primary Examiner* — Dionne Pendleton
(74) *Attorney, Agent, or Firm* — Oblon, McClelland, Maier & Neustadt, L.L.P.

(57) ABSTRACT

A key information sharing system includes a delivery device that delivers key information as first information for a control device equipped in an object and a user terminal that receives the first information delivered from the delivery device. The delivery device adds second information that allows the first information to be transferred between the user terminal and a third-party terminal without the delivery device, to the first information to be delivered to the user terminal. The user terminal transmits the first information to the third-party terminal in response to an input operation by a user, when the user terminal receives the first information to which the second information has been added.

22 Claims, 15 Drawing Sheets

(51) Int. Cl.
| | |
|---|---|
| *H04W 4/44* | (2018.01) |
| *H04W 12/08* | (2021.01) |
| *H04W 4/80* | (2018.01) |
| *H04W 4/40* | (2018.01) |
| *G07C 9/29* | (2020.01) |
| *H04W 12/0433* | (2021.01) |
| *H04W 12/0431* | (2021.01) |
| *H04W 12/50* | (2021.01) |
| *B60R 25/20* | (2013.01) |
| *B60R 25/24* | (2013.01) |
| *H04W 4/70* | (2018.01) |
| *H04W 12/04* | (2021.01) |
| *H04W 12/02* | (2009.01) |
| *H04W 12/06* | (2021.01) |

(52) U.S. Cl.
CPC .......... *B60R 25/24* (2013.01); *B60R 25/241* (2013.01); *G07C 9/00857* (2013.01); *G07C 9/29* (2020.01); *H04W 4/40* (2018.02); *H04W 4/44* (2018.02); *H04W 4/70* (2018.02); *H04W 4/80* (2018.02); *H04W 12/02* (2013.01); *H04W 12/0431* (2021.01); *H04W 12/0433* (2021.01); *H04W 12/04033* (2019.01); *H04W 12/06* (2013.01); *H04W 12/08* (2013.01); *H04W 12/50* (2021.01); *B60R 2325/205* (2013.01); *G07C 9/00571* (2013.01); *G07C 2009/00349* (2013.01); *G07C 2009/00769* (2013.01); *G07C 2009/00865* (2013.01); *G07C 2209/04* (2013.01)

(58) Field of Classification Search
CPC .......... G07C 2009/00476; G07C 2009/00531; G07C 2009/00841; G07C 9/00182; H04W 12/003; H04W 12/02; H04W 12/06; H04W 12/08; H04W 4/40; H04W 4/44; H04W 4/70; H04W 4/80; H04W 8/24; H04W 12/0431; H04W 12/0433; H04W 12/082; H04W 4/08; H04W 4/12; H04W 12/03; H04W 12/069; H04W 12/12; H04W 12/35; H04W 12/50; H04W 12/63; H04W 12/67; H04W 4/023; H04W 4/025; H04W 64/00; H04W 76/10; H04W 80/02; B60R 25/2018; B60R 2325/205; B60R 25/00; B60R 25/24; B60R 25/241; B60R 25/2081; B60R 2325/105; B60R 2325/202; B60R 25/04; B60R 9/00309; B60R 2009/00769; B60R 9/00571; B60R 9/00857; G06Q 10/087; H04L 67/306; H04L 2209/84; H04L 29/06; H04L 61/1594; H04L 63/0227; H04L 63/062; H04L 63/0823; H04L 63/0869; H04L 63/10; H04L 63/107; H04L 63/123; H04L 63/1408; H04L 63/1425; H04L 63/1433; H04L 63/145; H04L 63/166; H04L 69/14; H04L 9/3269; H04M 1/2757; B60L 2240/622; B60L 2240/662; B60L 2240/72; B60L 2250/12; B60L 2250/16; B60L 2260/52; B60L 2260/54; B60L 53/305; B60L 53/63; B60L 53/64; B60L 53/65; B60L 58/12; G06F 21/33; G06F 21/335; G06F 21/554; G06F 21/577; G06F 2221/2103; G06F 3/04817; G06F 3/0482; G06F 3/04842; Y02E 60/00; Y02T 10/70; Y02T 10/7072; Y02T 10/72; Y02T 90/12; Y02T 90/14; Y02T 90/16; Y02T 90/167; Y02T 90/169; Y04S 10/126; Y04S 30/14

See application file for complete search history.

(56) References Cited

U.S. PATENT DOCUMENTS

| | | | |
|---|---|---|---|
| 10,387,826 B2 * | 8/2019 | Simmons | ............ G06Q 10/087 |
| 2014/0049366 A1 | 2/2014 | Vasquez | |
| 2014/0066044 A1 * | 3/2014 | Ramnani | ............... H04L 67/306 |
| | | | 455/418 |
| 2015/0262441 A1 * | 9/2015 | Kim | ........................ B60R 25/00 |
| | | | 340/5.6 |
| 2017/0050617 A1 | 2/2017 | Penilla et al. | |

FOREIGN PATENT DOCUMENTS

| | | | |
|---|---|---|---|
| JP | 2010-126949 A | | 6/2010 |
| JP | 2010126949 A | * | 6/2010 |
| JP | 2012-41709 | | 3/2012 |
| JP | 2014-169059 A | | 9/2014 |
| JP | 2015-169008 | | 9/2015 |
| WO | WO 2014/028617 A1 | | 2/2014 |

* cited by examiner

# KEY INFORMATION SHARING SYSTEM, DELIVERY DEVICE AND USER TERMINAL

INCORPORATION BY REFERENCE

The disclosure of Japanese Patent Application No. 2017-218503 filed on Nov. 13, 2017 including the specification, drawings and abstract is incorporated herein by reference in its entirety.

BACKGROUND

1. Technical Field

The disclosure relates to a key information sharing system that allows key information for a control device equipped in an object to be shared, a delivery device that delivers the key information, and a user terminal that receives the key information delivered from the delivery device.

2. Description of Related Art

In recent years, there has been developed a system (hereinafter, also referred to as a "key system") that transmits key information from the exterior to a control device equipped in an object such as a vehicle or a facility, with a user terminal such as a smartphone, and thereby makes the control device perform a predetermined control to the object. Here, the key information is information associated with the object, and is information for putting the object into an available state.

As such a key system, for example, there is known a system that transmits the key information from a user terminal to an in-vehicle device mounted on a vehicle, and thereby makes the in-vehicle device perform a predetermined control such as a locking-unlocking control of locking or unlocking a door of the vehicle. Japanese Patent Application Publication No. 2015-169008 discloses a system that allows operation of a vehicle in the case where a key authentication succeeds between an electronic key (smart key) and the vehicle by matching in comparison with identification information transmitted from the electronic key to the vehicle and where a terminal authentication succeeds between the vehicle and a portable terminal that are performing pairing.

Further, Japanese Patent Application Publication No. 2012-41709 discloses a technology for transferring, to a third party, key information about a particular vehicle that is included in an electronic key possessed by a user. In the technology disclosed in JP 2012-41709 A, first, a user terminal possessed by the user receives the key information from the electronic key of the user by short-range wireless communication. Next, the user terminal transmits the key information to a third-party terminal possessed by the third party. Then, an electronic key of the third party receives the key information received by the third-party terminal by short-range wireless communication. Thereby, the electronic key of the third party can be used as a key for the particular vehicle.

SUMMARY

In some cases, the key information to be used in the key systems described above is delivered from a delivery device to the user terminal. In this case, at a time of utilization of a particular object, the user receives key information for a control device equipped in the object (that is, key information associated with the particular object) from the delivery device through the user terminal. Thereby, the user can utilize the particular object, using the user terminal.

Here, in the case where the user shares the particular object with a third party or lends the particular object to the third party, the user needs to lend the user terminal itself to the third party at the time of the utilization of the object by the third party, if only the user terminal has the key information and the third-party terminal possessed by the third party does not have the key information. However, such a situation significantly decreases convenience at a time of the sharing and lending of the object.

Further, for sharing the key information between the user terminal and the third-party terminal, it is possible that key information for lending is generated in the user terminal and the key information for lending is transferred from the user terminal to the third-party terminal. However, when the key information is generated in the user terminal and the generated key information is transferred from the user terminal to the third-party terminal, there is a possibility of the decrease in the security of the object.

The disclosure provides a technology that allows the key information for the control device equipped in the object to be shared by the user terminal and the third-party terminal while the security is ensured.

A key information sharing system according to a first aspect of the disclosure relates to a key information sharing system that allows key information as first information to be shared. The first information is associated with an object equipped with a control device, the control device performing a predetermined control to the object when the control device receives the first information from an external terminal. The key information sharing system according to the first aspect of the disclosure includes: a delivery device configured to deliver the first information; and a user terminal configured to receive the first information delivered from the delivery device. The delivery device includes an information generation unit configured to add second information to the first information that is delivered to the user terminal, the second information being information that allows the first information to be transferred between the user terminal and the third-party terminal without the delivery device. The user terminal includes a terminal-to-terminal communication unit configured to transmit the first information to the third-party terminal in response to an input operation by a user, when the user terminal receives the first information to which the second information has been added, from the delivery device.

In the key information sharing system according to the disclosure, when the control device equipped in the object receives the first information associated with the object, from the terminal in the exterior of the object, the control device performs the predetermined control to the object. Here, the control device may perform a predetermined authentication process for the first information received from the external terminal. In this case, when the authentication of the first information succeeds, the control device performs the predetermined control to the object. The external terminal is not limited to the user terminal, and even when the control device receives the first information from the third-party terminal, the control device can perform the predetermined control to the object.

The predetermined control is a control that is allowed to be performed when the control device receives the first information. For example, the predetermined control may include a locking-unlocking control of locking or unlocking the object. In the case where the object is a vehicle, the predetermined control may include a control of allowing a driving source (an internal combustion engine or a motor) of the vehicle to be started. In the case where the object is a facility, the predetermined control may include a control of turning on an electric power source of an electric product in the facility.

In the key information sharing system according to the aspect, the first information is delivered from the delivery device. Then, the user receives the first information delivered by the delivery device, through the user terminal. At this time, in the delivery device, the information generation unit adds the second information, which is the information that allows the first information to be transferred between the user terminal and the third-party terminal without the delivery device, to the first information that is delivered to the user terminal. That is, by adding the second information to the first information, the first information is allowed to be transferred from the user terminal to the third-party terminal. In other words, when the user terminal receives the first information to which the second information has not been added, the user terminal cannot transmit the first information to the third-party terminal. Therefore, only when the user terminal receives the first information to which the second information has been added, the user terminal, with the terminal-to-terminal communication unit, transmits the first information to the third-party terminal, in response to the input operation by the user.

With the key information sharing system according to the aspect, only the first information to which the second information has been added on the delivery device side is transmitted or received between the user terminal and the third-party terminal. That is, the first information to be transferred to the third-party terminal is also delivered from the delivery device. Thereby, the first information to be transferred from the user terminal to the third-party terminal can be recorded or managed on the delivery device side. Accordingly, the first information can be shared by the user terminal and the third-party terminal while the security is ensured.

In the key information sharing system according to the aspect, the information generation unit may further add third information to the first information when the information generation unit adds the second information to the first information, the third information being information that restricts the predetermined control that is allowed to be performed to the object when the control device receives the first information. Then, the user terminal may transmit the first information to which the third information has been added from the terminal-to-terminal communication unit to the third-party terminal, when the user terminal receives the first information to which the second information and the third information have been added, from the delivery device. Thereby, the third-party terminal receives the first information to which the third information has been added. Therefore, when the first information is transmitted from the third-party terminal to the control device, the predetermined control that is allowed to be performed to the object by the control device is restricted. Accordingly, the predetermined control that is allowed to be performed to the object by the control device can be restricted, when the third party utilizes the object using the third-party terminal.

The information generation unit may set a restriction content for the predetermined control, based on a function restriction request transmitted from the user terminal to the delivery device, and may add the third information to the first information, the restriction content being contained in the third information. Thereby, the user sets the content of the function restriction request that is delivered from the user terminal to the delivery device, and thereby, the user can determine the restriction content about the predetermined control that is allowed to be performed to the object by the control device when the third party transmits the first information from the third-party terminal to the control device.

Here, the user terminal may further include a registration unit configured to register a plurality of the third-party terminals while grouping the plurality of the third-party terminals into a plurality of groups. Then, the user terminal may set the restriction content in the function restriction request for each of the groups and may transmit the function restriction request to the delivery device. In this case, the information generation unit may add the third information corresponding to the function restriction request set for each of the groups, to the first information. Thereby, for each of the groups, the user can set the restriction content about the predetermined control that is allowed to be performed to the object by the control device when the first information is transmitted from the third-party terminal to the control device.

In the key information sharing system according to the aspect, the information generation unit may further add fourth information to the first information in the delivery device when the information generation unit adds the second information to the first information, the fourth information being information that restricts use of the first information by the third-party terminal. Then, the user terminal may transmit the first information to which the fourth information has been added from the terminal-to-terminal communication unit to the third-party terminal, when the user terminal receives the first information to which the second information and the fourth information have been added, from the delivery device. Thereby, the third-party terminal receives the first information to which the fourth information has been added. Accordingly, when the third party transmits the first information from the third-party terminal to the control device, it is possible to provide the restriction about the utilization of the object.

The information generation unit may set a restriction content for the first information, based on a use restriction request transmitted from the user terminal to the delivery device, and may add the fourth information to the first information, the restriction content being contained in the fourth information. Thereby, the user sets the content of the use restriction request that is delivered from the user terminal to the delivery device, and thereby, the user can determines the restriction content about the utilization of the object when the third party transmits the first information from the third-party terminal to the control device.

Here, the fourth information may contain information that restricts a use period or the number of times of use in which the third-party terminal is allowed to validly use the first information. In the case where the third-party terminal receives the first information to which the fourth information has been added, the period or the number of times in which the predetermined control is allowed to be performed to the object by the control device when the third-party terminal transmits the first information to the control device is restricted. Accordingly, it is possible to restrict the period or the number of times in which the third party is allowed to utilize the object. Further, in the case where the object is a movable body such as a vehicle, the fourth information may contain information that restricts a region in which the third-party terminal is allowed to validly use the first information. In the case where the third-party terminal receives the first information to which the fourth information has been added, the region in which the predetermined control is allowed to be performed to the movable body (object) by the control device when the third-party terminal transmits the first information to the control device is restricted. Accordingly, it is possible to restrict the region in which the third party is allowed to utilize the movable body (object).

In the case where the user terminal further includes a registration unit configured to register a plurality of the third-party terminals while grouping the plurality of the third-party terminals into a plurality of groups, the user terminal may set the restriction content in the use restriction request for each of the groups and may transmit the use restriction request to the delivery device. In this case, in the delivery device, the information generation unit adds the fourth information corresponding to the use restriction request set for each of the groups, to the first information. Thereby, for each of the groups, the user can set the restriction content about the utilization of the object when the third party transmits the first information from the third-party terminal to the control device.

In the key information sharing system according to the aspect, the information generation unit may further add fifth information to the first information when the information generation unit adds the second information to the first information, the fifth information being information that allows the first information to be transferred only between the user terminal and a particular third-party terminal belonging to a particular group without the delivery device. Then, the user terminal may transmit the first information only to the particular third-party terminal, when the user terminal receives the first information to which the second information and the fifth information have been added, from the delivery device. Thereby, it is possible to restrict a sharer for the first information, only to the particular third-party terminal.

The information generation unit may generate the fifth information based on information about the particular third-party terminal that is transmitted from the user terminal to the delivery device, and may add the fifth information to the first information. Thereby, the user can determine the particular group with which the first information is shared.

In the key information sharing system according to the aspect, on the user terminal side, the third information may be added to the first information that is transmitted from the user terminal to the third-party terminal. In this case, the user terminal adds the third information to the first information, and transmits the first information to which the third information has been added, to the third-party terminal, when the user terminal receives the first information to which the second information has been added, from the delivery device.

At this time, in the case where the user terminal further includes a registration unit configured to register a plurality of the third-party terminals while grouping the plurality of the third-party terminals into a plurality of groups, the user terminal may set the restriction content in the third information for each of the groups.

In the key information sharing system according to the aspect, on the user terminal side, the fourth information may be added to the first information that is transmitted from the user terminal to the third-party terminal. In this case, the user terminal adds the fourth information to the first information, and transmits the first information to which the fourth information has been added, to the third-party terminal, when the user terminal receives the first information to which the second information has been added, from the delivery device.

At this time, in the case where the user terminal further includes a registration unit configured to register a plurality of the third-party terminals while grouping the plurality of the third-party terminals into a plurality of groups, the user terminal may set the restriction content in the fourth information for each of the groups.

In the key information sharing system according to the aspect, on the user terminal side, the fifth information may be added to the first information. In this case, the user terminal adds the fifth information to the first information, and transmits the first information only to a particular third-party terminal, when the user terminal receives the first information to which the second information has been added, from the delivery device.

A delivery device according to a second aspect of the disclosure includes: an information transmitting unit configured to deliver key information as first information to a user terminal; and an information generation unit configured to add second information to the first information that is delivered to the user terminal, the second information being information that allows the first information to be transferred between the user terminal and a third-party terminal without the delivery device. The first information is associated with an object equipped with a control device, and the control device performs a predetermined control to the object when the control device receives the first information from an external terminal.

In the delivery device according to the aspect, the information generation unit may further add third information to the first information when the information generation unit adds the second information to the first information. At this time, the information generation unit may set a restriction content for the predetermined control, based on a function restriction request transmitted from the user terminal, and may add the third information to the first information, the restriction content being contained in the third information.

In the delivery device according to the aspect, the information generation unit may further add fourth information to the first information when the information generation unit adds the second information to the first information. At this time, the information generation unit may set a restriction content for the first information, based on a use restriction request transmitted from the user terminal, and may add the fourth information to the first information, the restriction content being contained in the fourth information.

In the delivery device according to the aspect, the information generation unit may further add fifth information to the first information when the information generation unit adds the second information to the first information. At this time, the information generation unit may further generate the fifth information based on information about a particular group that is transmitted from the user terminal, and may add the fifth information to the first information.

A user terminal according to a third aspect of the disclosure includes a terminal-to-terminal communication unit configured to transmit the first information to the third-party terminal in response to an input operation by a user, when the user terminal receives the first information to which the second information has been added, from the delivery device according to the second aspect of the disclosure.

According to the disclosure, the first information for the control device equipped in the object can be shared by the user terminal and the third-party terminal while the security is ensured.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, specific embodiments of the disclosure will be described based on the drawings. Dimensions, materials, shape, relative dispositions and others of constituent components described in the embodiments are not intended to limit the technical scope of the disclosure to the embodiments, unless otherwise mentioned.

First Embodiment

Here, an embodiment in the case where the disclosure is applied to a system allowing a user terminal and a third-party terminal to share authentication information for utilizing a particular vehicle will be described.

Overview of Key System

Figure 1:
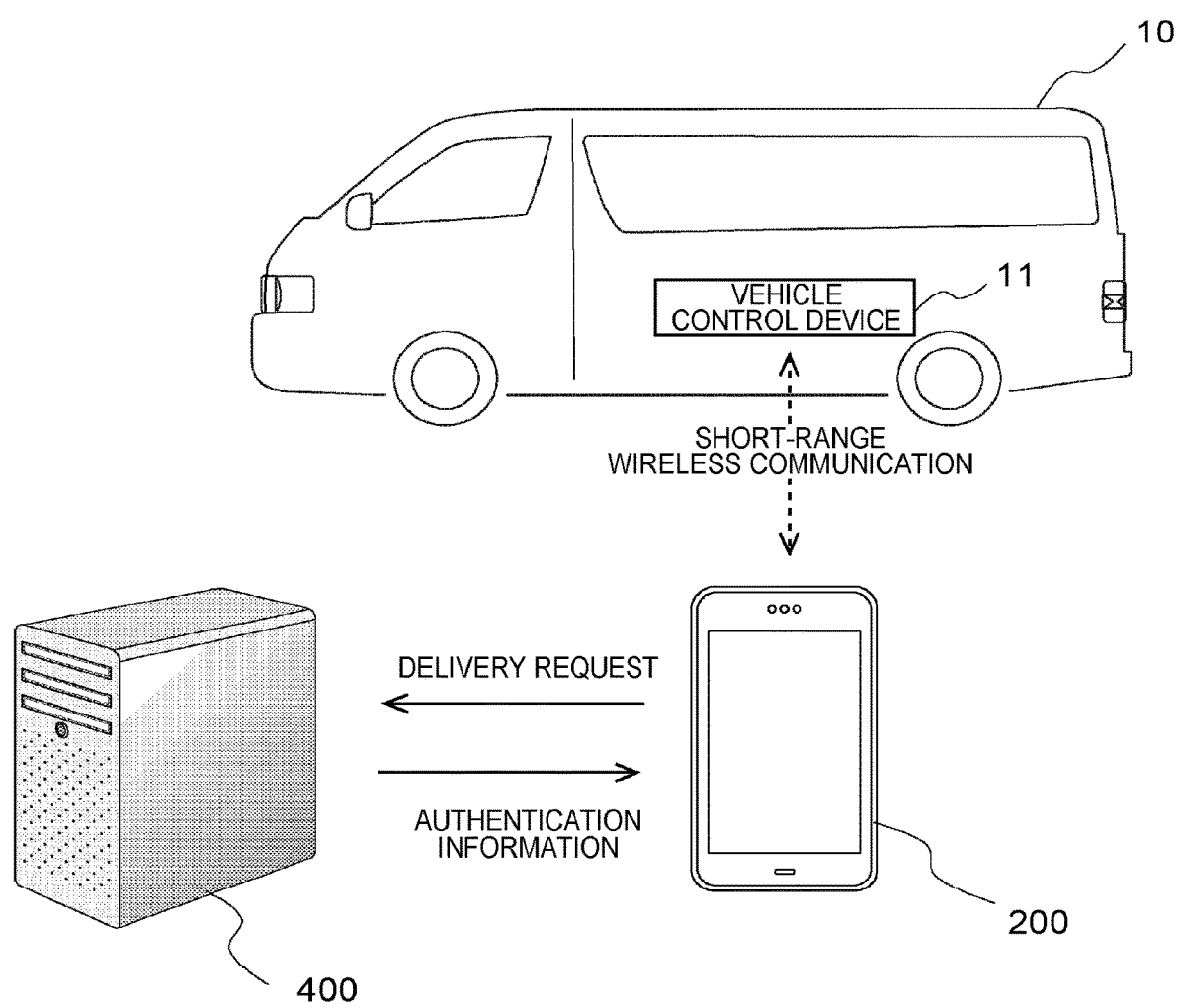
FIG. 1 is a diagram showing an overview of a key system according to an embodiment.

FIG. 1 is a diagram showing an overview of a key system according to the embodiment. The key system according to the embodiment is configured to include a vehicle control device 11 mounted on a vehicle 10, a portable terminal 200, and a server device 400. The portable terminal 200 is a terminal possessed by a person who utilizes the vehicle 10. The server device 400 is a delivery device that delivers authentication information associated with the vehicle 10.

In the key system according to the embodiment, the portable terminal 200 and the server device 400 are connected to each other through a network such as the internet that is a public communication network. When the server device 400 receives a delivery request from the portable terminal 200, the server device 400 delivers the authentication information to the portable terminal 200. Further, the portable terminal 200 transmits the authentication information received from the server device 400, to the vehicle control device 11 mounted on the vehicle 10, by short-range wireless communication. The vehicle control device 11 authenticates the authentication information received from the portable terminal 200. When the authentication of the authentication information succeeds, the vehicle control device 11 can control the vehicle 10. In the embodiment, the vehicle 10 corresponds to the "object", and the vehicle control device 11 corresponds to the "control device". Further, in the embodiment, the authentication information corresponds to the "key information" (first information), and the server device 400 corresponds to the "delivery device".

System Configuration of Key System

Figure 2:
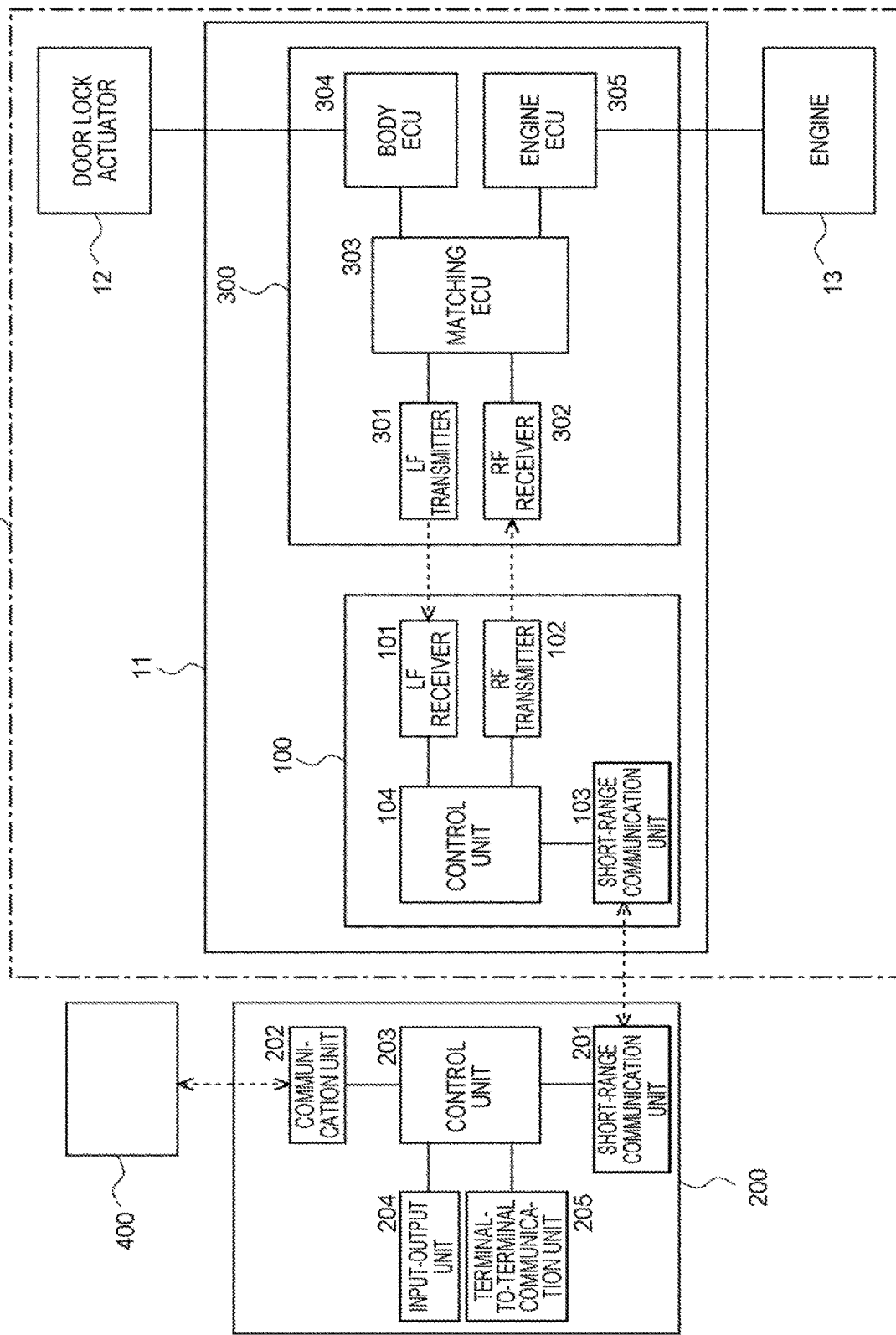
FIG. 2 is a block diagram schematically showing an exemplary configuration of a portable terminal, a server device and a vehicle control device mounted on a vehicle that are shown in FIG. 1.

Each constituent element of the key system according to the embodiment will be described based on FIG. 2. FIG. 2 is a block diagram schematically showing an exemplary configuration of the portable terminal 200, the server device 400 and the vehicle control device 11 mounted on the vehicle 10 that are shown in FIG. 1. The vehicle control device 11 includes a key unit 100 that performs communication with the portable terminal 200 and a control device 300 that executes various controls to the vehicle 10.

Specifically, the control device 300 executes a locking-unlocking control of locking or unlocking a door of the vehicle 10 by controlling a door lock actuator 12 of the vehicle 10. Further, the control device 300 executes an engine control such as a start control of starting an engine 13 that is a driving source of the vehicle 10. In the vehicle 10, the control device 300 executes the various controls by transmitting and receiving electric waves in a radio frequency (hereinafter, referred to as RF) band and a low frequency (hereinafter, referred to as LF) band to and from the key unit 100.

The control device 300 is configured to include an LF transmitter 301, an RF receiver 302, a matching ECU 303, a body ECU 304, and an engine ECU 305. The LF transmitter 301 is a device that transmits an electric wave in an LF band (for example, 100 KHz to 300 KHz) for searching (polling) the key unit 100. The RF receiver 302 is a device that receives an electric wave in an RF band (for example, 100 MHz to 1 GHz) transmitted from the key unit 100.

The matching ECU 303 is a computer that controls the body ECU 304 and the engine ECU 305 based on a command signal that is transmitted from the key unit 100 with the electric wave in the RF band. For example, the matching ECU 303 is constituted by a microcomputer. The matching ECU 303 authenticates the command signal transmitted from the key unit 100, based on whether the command signal is a signal transmitted from a valid device. Specifically, the matching ECU 303 determines whether a key ID contained in the command signal coincides with a key ID previously stored in a storage unit included in the matching ECU 303.

When the authentication of the key ID succeeds, the matching ECU 303 transmits a command corresponding to the command signal, to the body ECU 304 and the engine ECU 305, through an in-vehicle network such as a controller area network (CAN). Specifically, when the command signal received from the key unit 100 is a locking signal, the matching ECU 303 transmits a locking command for locking the door of the vehicle 10, to the body ECU 304. When the command signal received from the key unit 100 is an unlocking signal, the matching ECU 303 transmits an unlocking command for unlocking the door of the vehicle 10, to the body ECU 304. When the command signal received from the key unit 100 is an engine start permission signal, the matching ECU 303 transmits an engine start permission command for allowing the engine 13 of the vehicle 10 to be started, to the engine ECU 305.

The body ECU 304 is a computer that performs a body control for the vehicle 10. The body ECU 304 is electrically connected to the door lock actuator 12 that performs the locking and unlocking of the door of the vehicle 10. The body ECU 304 has a function to lock and unlock the door of the vehicle 10 by controlling the door lock actuator 12 based on the locking command or unlocking command received from the matching ECU 303.

The engine ECU 305 is a computer that controls the engine 13 of the vehicle 10. The engine ECU 305 is electrically connected to various apparatuses for controlling the engine 13, as exemplified by a fuel injection valve, an ignition plug, a throttle valve, and starter (each of which is not illustrated). When the engine ECU 305 receives the engine start permission command from the matching ECU 303, the engine ECU 305 is put into an engine start allowing state in which the stopped engine 13 can be started. The engine start allowing state is a state in which the engine ECU 305 can perform a start control for the engine 13 when an ignition switch (or a push start switch) is turned on in the vehicle 10.

Next, the key unit 100 will be described. The key unit 100 is a device that is disposed at a predetermined position (for example, the interior of a glove box) in a vehicle cabin of the vehicle 10. The key unit 100 has a function to authenticate the portable terminal 200 by performing short-range wireless communication with the portable terminal 200, and a function to transmit a command signal to the control device 300 using an electric wave in an RF band, based on the authentication result. The key unit 100 is configured to include an LF receiver 101, an RF transmitter 102, a short-range communication unit 103, and a control unit 104.

The LF receiver 101 is a device that receives a polling signal transmitted from the control device 300 with an electric wave in an LF band. The RF transmitter 102 is a device that transmits a command signal to the control device 300 with an electric wave in an RF band. The short-range communication unit 103 is a device that performs communication with the portable terminal 200 in the exterior of the vehicle 10. The short-range communication unit 103 performs communication in a short range (a range allowing communication between the interior and exterior of the vehicle cabin), using a predetermined wireless communication standards. Examples of the communication standards to be used for the communication by the short-range communication unit 103 include Bluetooth (R), Low Energy standards, Near Field Communication (NFC), Ultra Wide Band (UWB), and WiFi (R).

The control unit 104 is a computer that performs a process for performing the short-range wireless communication with the portable terminal 200, a process for authenticating the portable terminal 200, a process for transmitting a command signal to the control device 300, and the like. For example, the control unit 104 is constituted by a microcomputer.

The control unit 104 has a function to control the LF receiver 101, the RF transmitter 102 and the short-range communication unit 103. Furthermore, the control unit 104 authenticates authentication information contained in a control request that is transmitted from the portable terminal 200 by the short-range wireless communication. Specifically, the control unit 104 determines whether the authentication information transmitted from the portable terminal 200 coincides with authentication information previously stored in a storage unit included in the control unit 104. When the authentication succeeds, the control unit 104 transmits a command signal corresponding to a control request received from the portable terminal 200, to the control device 300 through the RF transmitter 102. Specifically, when the control request received from the portable terminal 200 is a locking request, the control unit 104 transmits the locking signal to the control device 300. When the control request received from the portable terminal 200 is an unlocking request, the control unit 104 transmits the unlocking signal and the engine start permission signal to the control device 300.

At this time, the key unit 100 transmits the key ID to the control device 300 together with the command signal. The key ID may be previously stored in the key unit 100 as a plain text, or may be stored while being encrypted by a code specific to the portable terminal 200. In the case where the key ID is stored while being encrypted, the encrypted key ID may be decrypted by the authentication information transmitted from the portable terminal 200, and the original key ID may be obtained.

Next, the portable terminal 200 will be described. For example, the portable terminal 200 is a small-size computer such as a smart phone, a cellular phone, a tablet terminal, a personal information terminal, and a wearable computer (a smart watch or the like). The portable terminal 200 is configured to include a short-range communication unit 201, a communication unit 202, a terminal-to-terminal communication unit 205, a control unit 203, and an input-output unit 204.

The short-range communication unit 201 is a device that performs communication with the key unit 100 of the vehicle control device 11 in the same communication standards as for the short-range communication unit 103. The communication unit 202 is a device that connects the portable terminal 200 to a network for performing communication with the server device 400. The communication unit 202 can perform the communication with the server device 400 via the network, using a mobile communication service such as 3G and LTE, for example. The terminal-to-terminal communication unit 205 is means for performing communication with a different portable terminal. The terminal-to-terminal communication unit 205 may be a device that performs short-range wireless communication with the different portable terminal in the same communication standards as for the short-range communication unit 201. Similarly to the communication unit 202, the terminal-to-terminal communication unit 205 may be a device that performs the communication with the different portable terminal via a network.

The control unit 203 is a computer that controls the portable terminal 200. For example, the control unit 203 is constituted by a microcomputer. The control unit 203 controls the short-range communication unit 201, the communication unit 202 and the terminal-to-terminal communication unit 205, in response to an input operation to the input-output unit 204 by a user. For example, the control unit 203 performs a process of requesting the delivery of the authentication information corresponding to the vehicle 10 to the server device 400 and receiving the delivered authentication information, through the communication unit 202. The authentication information received from the server device 400 is stored in a storage unit included in the control unit 203. Further, the control unit 203 performs a process of generating a control request corresponding to the input operation by the user and transmitting the control request to the key unit 100 through the short-range communication unit 201 together with the authentication information stored in the storage unit. Further, the control unit 203 transmits the authentication information received from the server device 400, to the different portable terminal through the terminal-to-terminal communication unit 205. A transfer of the authentication information between the portable terminals through the terminal-to-terminal communication unit 205 will be described later in detail.

The input-output unit 204 functions as means for accepting the input operation performed by the user and further presenting information to the user. Specifically, the input-output unit 204 is configured to include a touch panel display and control means for the touch panel display. The input-output unit 204 may include a hardware switch and the like that is operated by the user.

Behavior of Key System

Figure 3:
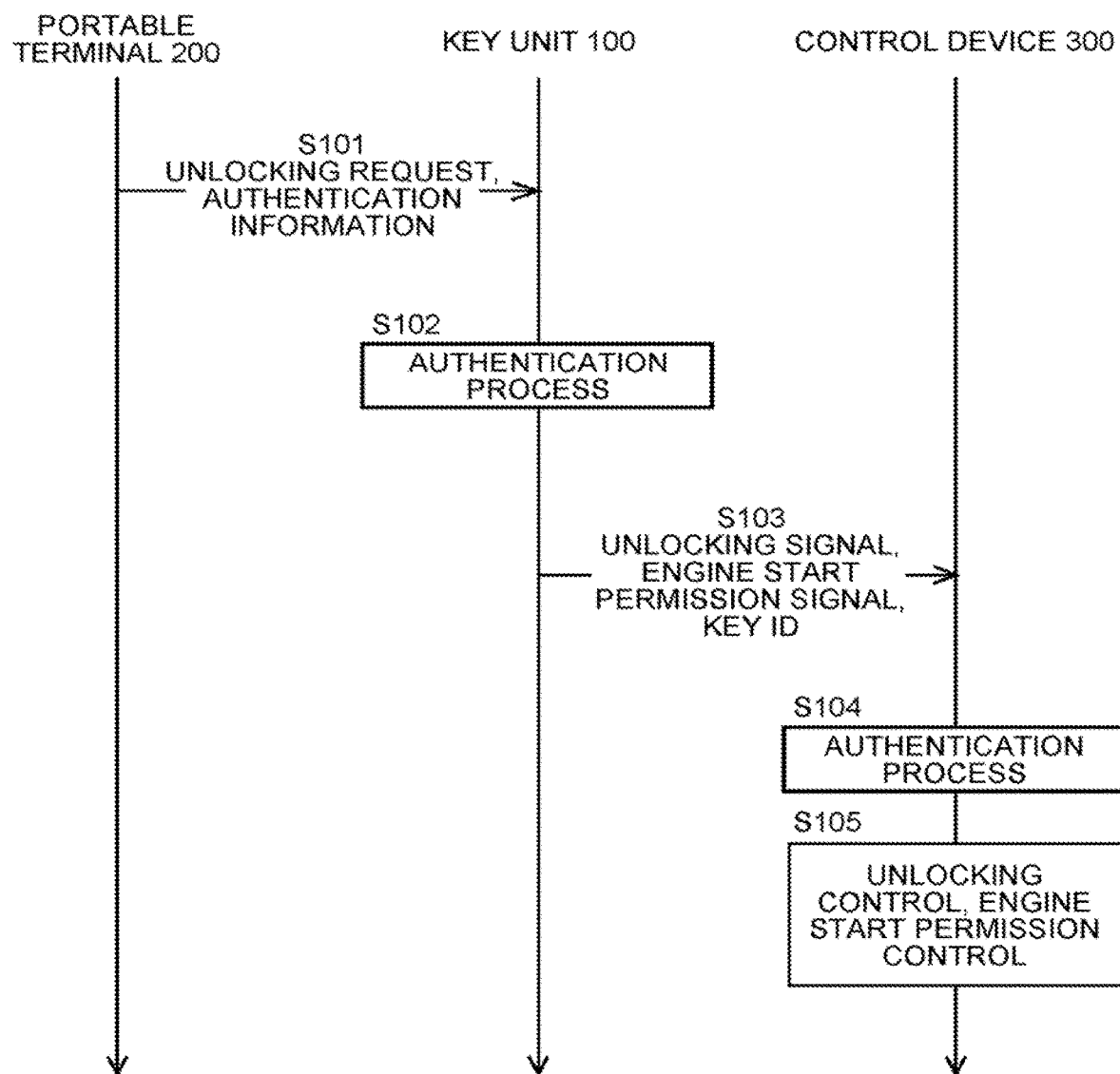
FIG. 3 is a diagram showing a flow of processes and data when a door of the vehicle is unlocked.

Here, a behavior of the key system when the user controls the vehicle 10 using the portable terminal 200 will be described with an example in which the door of the vehicle 10 is unlocked. FIG. 3 is a diagram showing a flow of processes and data when the door of the vehicle 10 is unlocked.

When the user performs, to the portable terminal 200, an operation for unlocking the door of the vehicle 10, the portable terminal 200 transmits the unlocking request and the authentication information to the key unit 100 of the vehicle control device 11 (S101). Then, the key unit 100 performs an authentication process based on the authentication information received from the portable terminal 200 (S102). When the authentication of the authentication information succeeds, the key unit 100 transmits the key ID to the control device 300, together with the unlocking signal and the engine start permission signal (S103). Then, the control device 300 performs an authentication process based on the key ID received from the key unit 100 (S104). When the authentication of the key ID succeeds, the control device 300 performs an unlocking control of unlocking the door of the vehicle 10 and an engine start permission control of putting the engine ECU 305 into the engine start allowing state (S105).

In the embodiment, the locking-unlocking control and the engine start permission control correspond to the "predetermined control". However, the "predetermined control" is not limited to these controls, and may include another control that is allowed to be performed when the vehicle control device 11 receives the authentication information from the portable terminal 200.

Sharing of Authentication Information

In the above-described key system, when the user receives the authentication information corresponding to the vehicle 10 from the server device 400 with the user's own portable terminal (hereinafter, also referred to as a "user terminal"), the user terminal can be used as a key for the vehicle 10. On this occasion, in the case where the user shares the vehicle 10 with a third party or lends the vehicle 10 to the third party, the user needs to lend the user terminal itself to the third party at the time of the utilization of the vehicle 10 by the third party, if only the user terminal has the authentication information and a portable terminal possessed by the third party (hereinafter, also referred to as a "third-party terminal") does not have the authentication information. However, the situation in which the user lends the user terminal itself to the third party significantly decreases convenience. Hence, in the key system according to the embodiment, the authentication information can be shared by the user terminal and the third-party terminal.

Figure 4:
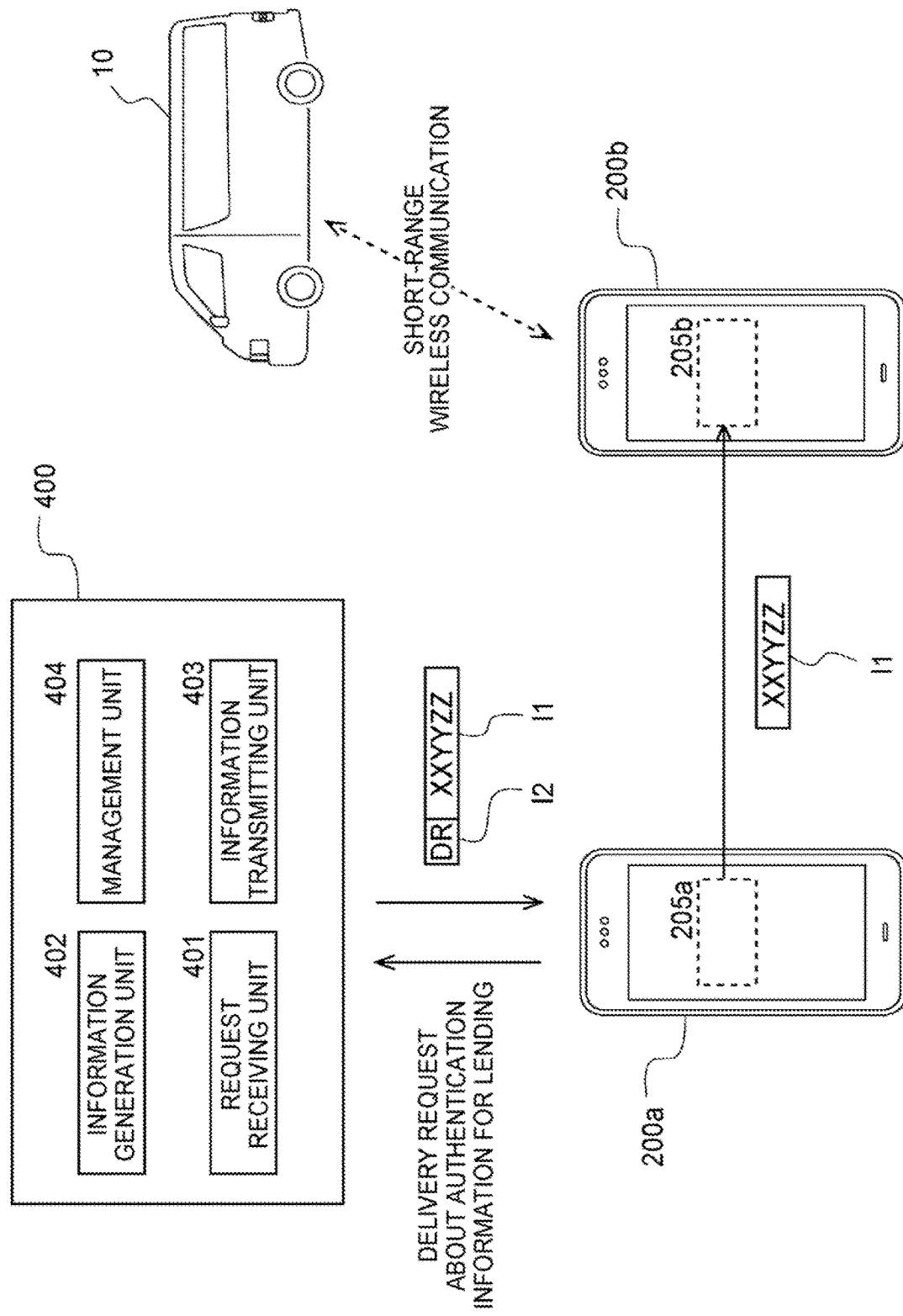
FIG. 4 is a diagram for describing a transfer of authentication information from a user terminal to a third-party terminal according to a first embodiment.

FIG. 4 is a diagram for describing a transfer of the authentication information from the user terminal to the third-party terminal according to the embodiment. In FIG. 4, reference numeral 200a denotes the user terminal, and reference numeral 200b denotes the third-party terminal. The user terminal 200a and the third-party terminal 200b have the same configuration as the portable terminal 200 shown in FIG. 2. Therefore, the third-party terminal 200b can also perform the short-range wireless communication with the vehicle control device 11 of the vehicle 10. Accordingly, when the third-party terminal 200b acquires the authentication information corresponding to the vehicle 10, the third party can use the third-party terminal 200b as a key for the vehicle 10. Hence, in the embodiment, the user terminal 200a acquires authentication information for lending from the server device 400, and the user terminal 200a transfers the authentication information to the third-party terminal 200b.

Here, a configuration of the server device 400 will be described. The server device 400 is a computer that includes a microprocessor, a storage device, an input-output device and a communication device, and the microprocessor executes programs to realize the following functions. However, some or all of the functions may be realized by hardware circuits such as ASICs and FPGAs. Further, the server device 400 does not need to be realized by a single computer, or may be realized by a plurality of computers in cooperation.

As shown in FIG. 4, the server device 400 includes a request receiving unit 401, an information generation unit 402, an information transmitting unit 403, and a management unit 404. The request receiving unit 401 is means for receiving the delivery request for the authentication information that is transmitted from the user terminal 200a. The request receiving unit 401 receives the delivery request transmitted from the user terminal 200a, via the network.

The information generation unit 402 is means for generating the authentication information corresponding to the delivery request from the user terminal 200a that is received by the request receiving unit 401. The information generation unit 402 generates the authentication information associated with the vehicle 10 that is a utilization object. The information transmitting unit 403 is means for transmitting the authentication information generated by the information generation unit 402, to the user terminal 200a. The information transmitting unit 403 transmits the authentication information to the user terminal 200a via the network. The management unit 404 is means for managing delivery situation of the authentication information from the server device 400. For example, the management unit 404 stores the authentication information to be delivered and the user terminal as the delivery destination, in association with each other.

Here, in the case where the user shares the vehicle 10 with the third party or lends the vehicle 10 to the third party, the user, by operating the user terminal 200a, transmits the delivery request about the authentication information for lending from the user terminal 200a to the server device 400. In the server device 400, when the request receiving unit 401 receives the delivery request about the authentication information for lending, the information generation unit 402 adds transfer allowing information (DR) I2 (second information) to authentication information I1 associated with the vehicle 10. Then, the information transmitting unit 403 transmits the authentication information I1 to which the transfer allowing information I2 has been added, to the user terminal 200a. Here, the transfer allowing information I2 is information that allows the authentication information I1 to be transferred between the user terminal 200a and the third-party terminal 200b without the server device 400. That is, by the addition of the transfer allowing information I2 to the authentication information I1, the authentication information I1 is allowed to be transmitted from the user terminal 200a to the third-party terminal 200b. In other words, when the user terminal 200a receives the authentication information I1 to which the transfer allowing information I2 has not been added, the user terminal 200a cannot transmit the authentication information I1 to the third-party terminal 200b. When the server device 400 delivers the authentication information to which the transfer allowing information has been added, the management unit 404, similarly, stores the authentication information and the user terminal as the delivery destination, in association with each other.

When the user terminal 200a receives the authentication information I1 to which the transfer allowing information I2 has been added, the user terminal 200a transmits the authentication information I1 to the third-party terminal 200b through the terminal-to-terminal communication unit 205a, in response to the input operation by the user. Then, the third-party terminal 200b stores the authentication information I1 received from the user terminal 200a through the terminal-to-terminal communication unit 205b, in the storage unit included in the control unit 203. Thereby, the authentication information I1 associated with the vehicle 10 can be shared by the user terminal 200a and the third-party terminal 200b. As a result, the third party can use the third-party terminal 200b as a key for the vehicle 10. The transfer allowing information I2 is not added to the authentication information I1 that is transmitted from the user terminal 200a to the third-party terminal 200b. Thereby, the authentication information I1 cannot be transmitted from the third-party terminal 200b to a different portable terminal. Therefore, it is possible to prevent the authentication information from being sublet.

Figure 5:
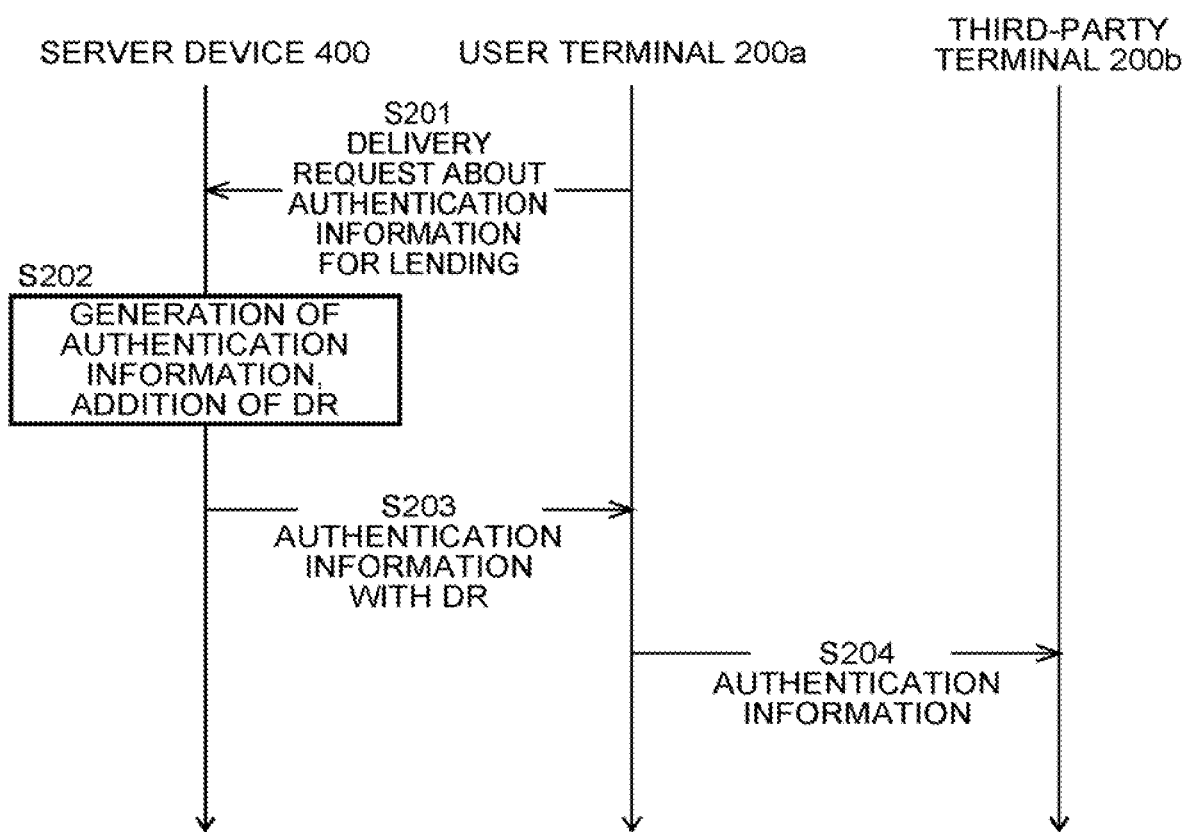
FIG. 5 is a diagram showing a flow of processes and data when the authentication information is transferred from the user terminal to the third-party terminal according to the first embodiment.

FIG. 5 is a diagram showing a flow of processes and data when the authentication information is transferred from the user terminal 200a to the third-party terminal 200b. When the user performs an operation for requesting the user terminal 200a to acquire the authentication information for lending through the input-output unit 204, the user terminal 200a transmits the delivery request about the authentication information for lending to the server device 400 (S201). When the server device 400 receives the delivery request, in the server device 400 the information generation unit 402 generates the authentication information associated with the vehicle 10, and adds the transfer allowing information (DR) to the authentication information (S202). Then, the server device 400 transmits the authentication information to which the transfer allowing information has been added, to the user terminal 200a (S203). Thereafter, the user performs an operation for transmitting the authentication information to the third-party terminal 200b through the input-output unit 204, to the user terminal 200a, so that the user terminal 200a transmits the authentication information to the third-party terminal 200b (S204).

The third-party terminal 200b stores the authentication information received from the user terminal 200a. Then, when the third party controls the vehicle 10 using the third-party terminal 200b, the authentication information stored in the third-party terminal 200b is transmitted to the vehicle control device 11. Thereby, the key unit 100 and the control device 300 of the vehicle control device 11 behave as in the case of receiving the authentication information from the user terminal 200a.

As described above, in the embodiment, the authentication information for lending is delivered from the server device 400 to the user terminal 200a, and the authentication information is transmitted from the user terminal 200a to the third-party terminal 200b. That is, the authentication information transferred to the third-party terminal 200b is also the information delivered from the server device 400. Therefore, it is possible to avoid the authentication information from being generated in the user terminal 200a with no restriction, and to avoid the generated authentication information from being transferred to the third-party terminal 200b. Accordingly, the authentication information can be shared by the user terminal 200a and the third-party terminal 200b while the security is ensured. Further, since the authentication information for lending is delivered from the server device 400, the authentication information to be transferred from the user terminal 200a to the third-party terminal 200b can be recorded or managed on the server device 400 side.

Modification

In the first embodiment, the vehicle control device 11 includes the key unit 100. Further, the authentication information is transmitted from the portable terminal 200 to the key unit 100, and then the key ID is transmitted from the key unit 100 to the control device 300. However, a configuration in which the key unit 100 does not intervene between the portable terminal 200 and the control device 300 can be employed. In this case, the key ID is delivered from the server device 400 to the portable terminal 200. Then, the key ID is transmitted from the portable terminal 200 to the control device 300. At this time, the key ID corresponds to the "key information". Also in the case of employing such a configuration, the key ID can be shared by the user terminal 200a and the third-party terminal 200b while the security is ensured, by adding the transfer allowing information that allows the key ID to be transferred between the user terminal 200a and the third-party terminal 200b without the server device 400, to the key ID to be delivered from the server device 400.

Second Embodiment

The overview of the key system according to the embodiment is the same as that according to the first embodiment.

In the embodiment, it is possible to restrict the control that the third party is allowed to perform to the vehicle using the third-party terminal. For the embodiment, different points from the first embodiment will be mainly described below.

Operation of User Terminal

When the user shares the vehicle 10 with the third party, the user sometimes permits the third party to access the vehicle cabin (or a luggage room) of the vehicle 10 (that is, the user permits the third party to lock and unlock the door of the vehicle 10), but does not permit the third party to drive the vehicle 10. In the embodiment, in such a case, the user demands to add function restriction information (third information) to the authentication information for lending, at a time when the user requests the delivery of the authentication information for lending to the server device 400.

Figure 6:
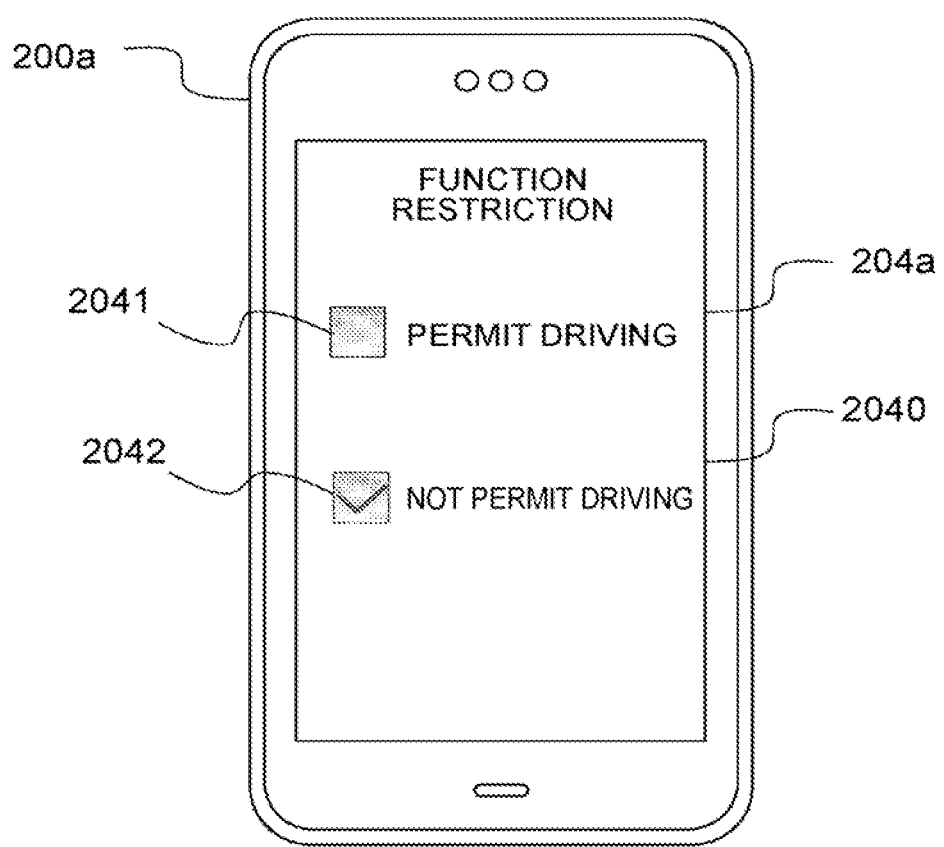
FIG. 6 is a diagram showing an operation screen of a touch panel display included in an input-output unit of a user terminal according to a second embodiment.

FIG. 6 is a diagram showing an operation screen 2040 of a touch panel display that is included in an input-output unit 204*a* of a user terminal 200*a* and that is operated when the user requests the delivery of the authentication information for lending to the server device 400. The operation screen 2040 includes a "PERMIT DRIVING" button 2041 and a "NOT PERMIT DRIVING" button 2042, which are operation buttons (UI elements).

In the case where the user permits the third party to drive the vehicle 10, the user selects the "PERMIT DRIVING" button 2041 on the operation screen 2040. In the case where the "PERMIT DRIVING" button 2041 is selected, the addition of the function restriction information to the authentication information for lending is not demanded to the server device 400. On the other hand, in the case where the user does not permit the third party to drive the vehicle 10, the user selects the "NOT PERMIT DRIVING" button 2042 on the operation screen 2040. In the case where the "NOT PERMIT DRIVING" button 2042 is selected, the addition of the function restriction information to the authentication information for lending is demanded to the server device 400. FIG. 6 illustrates a state in which a checkbox of the "NOT PERMIT DRIVING" button 2042 has been checked because the user selected the "NOT PERMIT DRIVING" button 2042.

Sharing of Authentication Information

Figure 7:
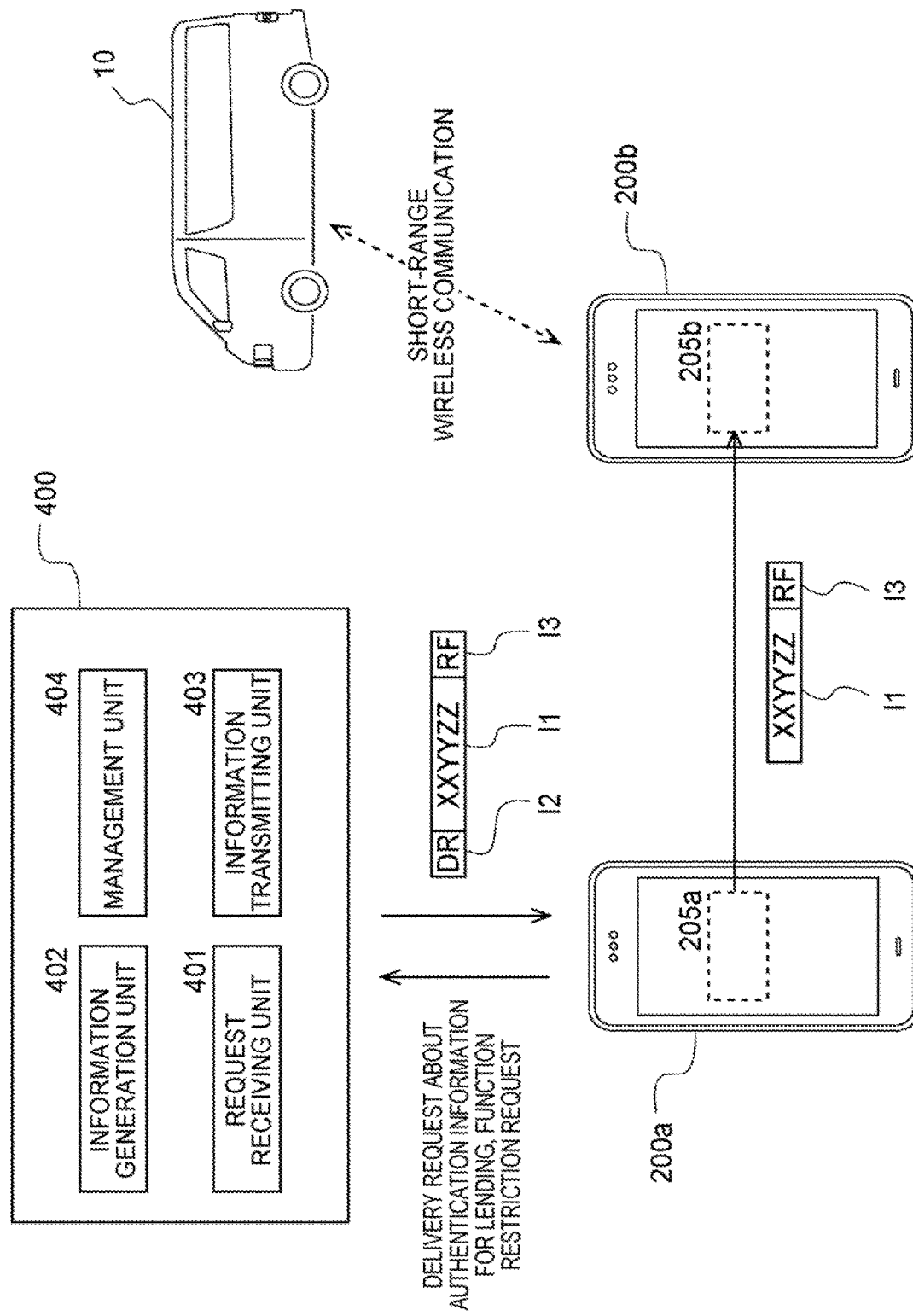
FIG. 7 is a diagram for describing a transfer of the authentication information from the user terminal to the third-party terminal according to the second embodiment.
Figure 8:
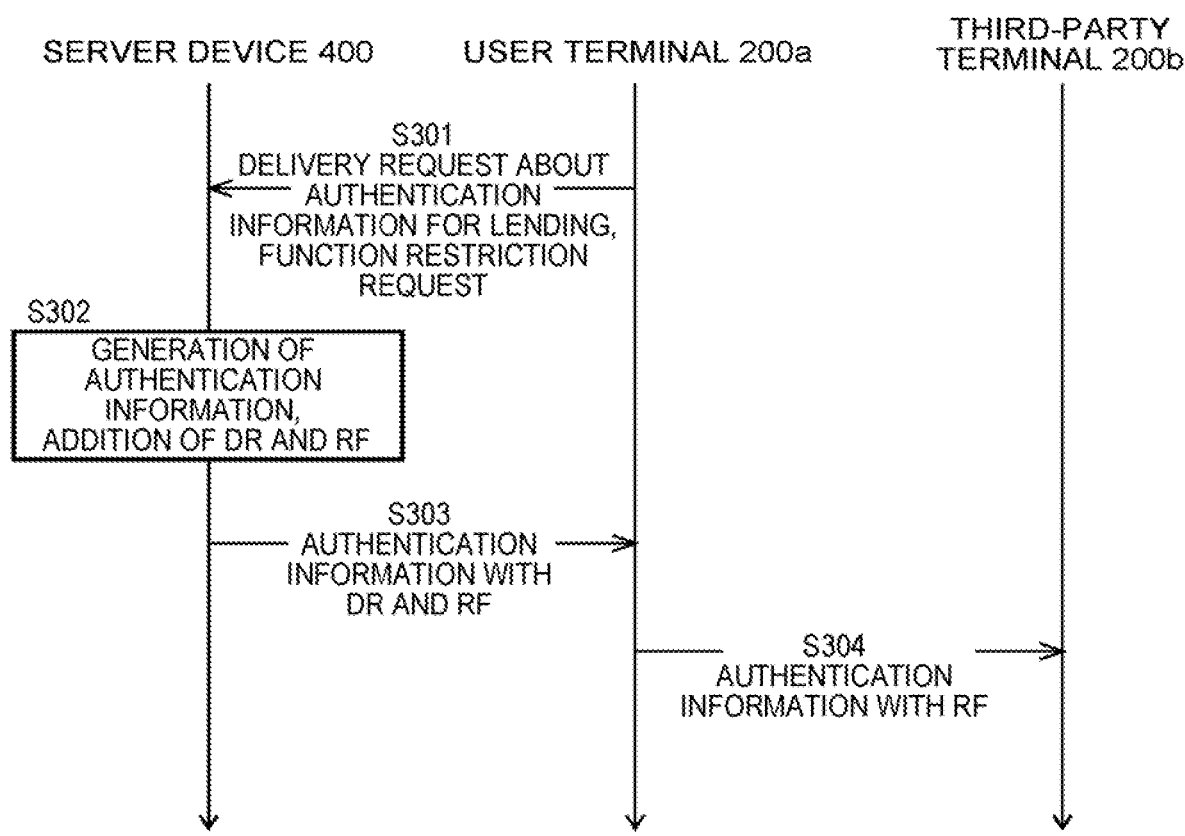
FIG. 8 is a diagram showing a flow of processes and data when the authentication information is transferred from the user terminal to the third-party terminal according to the second embodiment.

FIG. 7 is a diagram for describing a transfer of the authentication information from the user terminal 200*a* to the third-party terminal 200*b* in the key system according to the embodiment in the case where the user does not permit the third party to drive the vehicle (that is, in the case where the user selects the "NOT PERMIT DRIVING" button 2042 on the operation screen 2040 of the user terminal 200*a* shown in FIG. 6). FIG. 8 is a diagram showing a flow of processes and data when the authentication information is transferred from the user terminal 200*a* to the third-party terminal 200*b* in that case.

In the case where the user selects the "NOT PERMIT DRIVING" button 2042 on the operation screen 2040 of the user terminal 200*a*, the user terminal 200*a* transmits the function restriction request about the authentication information for lending to the server device 400, together with the delivery request about the authentication information for lending (S301 in FIG. 8). In the server device 400, when the request receiving unit 401 receives the requests, the information generation unit 402 generates the authentication information I1 associated with the vehicle 10. Furthermore, the information generation unit 402 adds function restriction information (RF) I3 to the authentication information I1, together with the transfer allowing information (DR) I2 (S302 in FIG. 8).

At this time, the function restriction information I3 is generated based on the function restriction request received from the user terminal 200*a*. That is, a restriction content to be restricted by the function restriction information I3 is set depending on a request content of the function restriction request. Here, since the "NOT PERMIT DRIVING" button 2042 is selected on the operation screen 2040 of the user terminal 200*a*, the function restriction request is transmitted from the user terminal 200*a*. That is, in this function restriction request, the user requests that the engine start permission control be not executed in the vehicle control device 11 of the vehicle 10. Therefore, the function restriction information I3 is generated as information for restricting the execution of the engine start permission control by the vehicle control device 11 of the vehicle 10. A behavior of the vehicle control device 11 of the vehicle 10 when the vehicle control device 11 receives the authentication information I1 to which the function restriction information I3 has been added will be described later in detail.

Then, the information transmitting unit 403 of the server device 400 transmits the authentication information I1 to which the transfer allowing information I2 and the function restriction information I3 have been added, to the user terminal 200*a* (S303 in FIG. 8). Then, when the user terminal 200*a* receives the authentication information I1 to which the transfer allowing information I2 and the function restriction information I3 have been added, the user terminal 200*a* transmits the authentication information I1 to which the function restriction information I3 has been added, to the third-party terminal 200*b* through the terminal-to-terminal communication unit 205*a*, in response to the input operation by the user (S304 in FIG. 8). The third-party terminal 200*b* stores the authentication information I1 to which the function restriction information I3 has been added and that has been received from the user terminal 200*a* through the terminal-to-terminal communication unit 205*b*, in the storage unit included in the control unit 203.

Behavior of Key System

Figure 9:
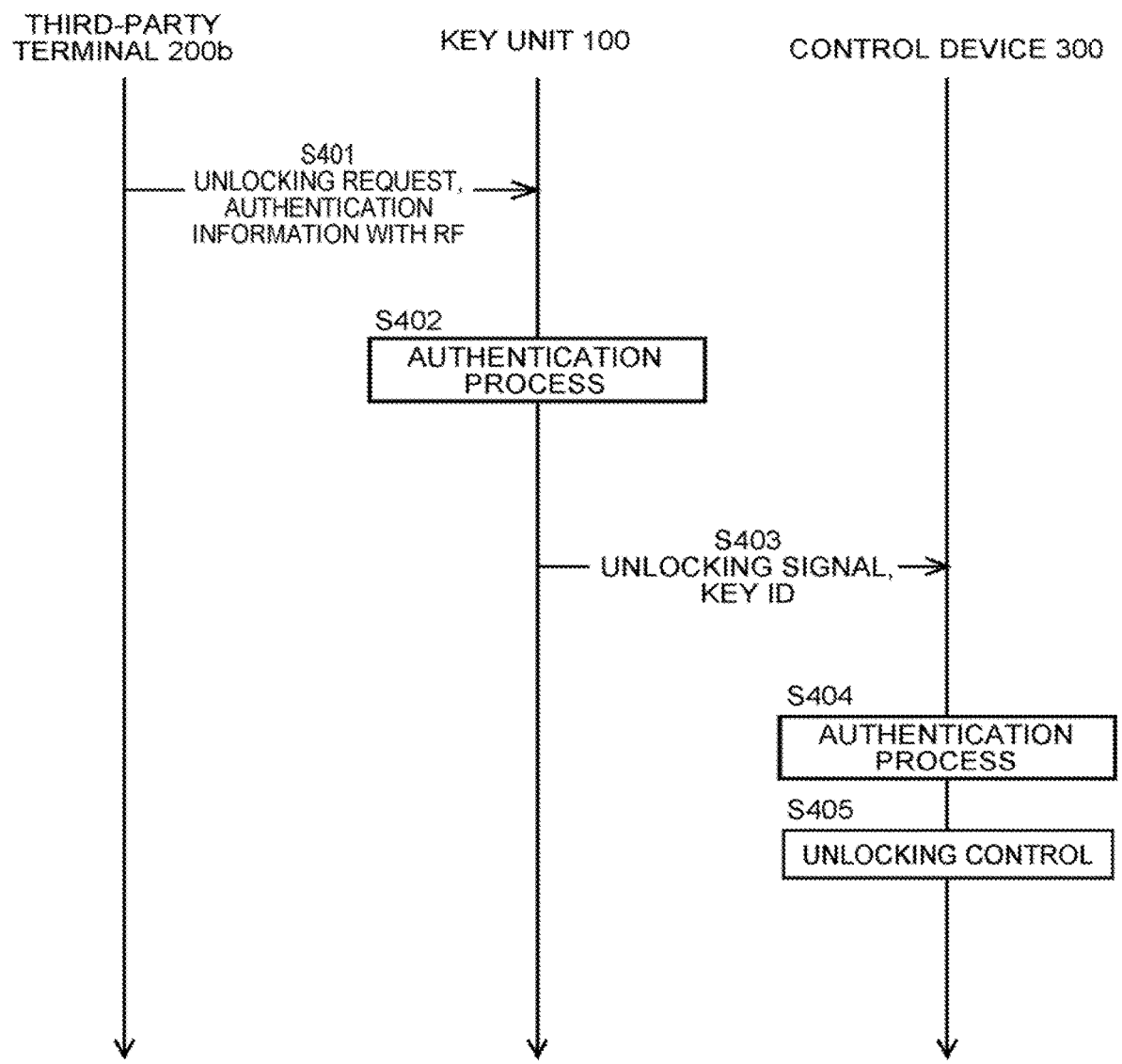
FIG. 9 is a diagram showing a flow of processes and data when the door of the vehicle is unlocked according to the second embodiment.

Next, a behavior of the key system in the embodiment when the third party unlocks the door of the vehicle 10 using the third-party terminal 200*b* having the authentication information I1 to which the function restriction information I3 has been added will be described. FIG. 9 is a diagram showing a flow of processes and data when the door of the vehicle 10 is unlocked.

When the third party performs, to the third-party terminal 200*b*, the operation for unlocking the door of the vehicle 10, the third-party terminal 200*b* transmits the authentication information to which the function restriction information (RF) has been added, to the key unit 100 of the vehicle control device 11, together with the unlocking request (S401). Then, the key unit 100 performs the authentication process based on the authentication information received from the third-party terminal 200*b* (S402). The authentication process itself of S402 is the same as the authentication process of S102 in FIG. 3. However, in the case where the function restriction information has been added to the authentication information, the engine start permission signal is not transmitted from the key unit 100, even when the authentication of the authentication information succeeds in the authentication process of S402. That is, together with the key ID, only the unlocking signal is transmitted from the key unit 100 to the control device 300 (S403). Then, the control device 300 receives the key ID and the unlocking signal, and performs the authentication process based on the key ID (S404). When the authentication of the key ID succeeds, the control device 300 performs the unlocking control of unlocking the door of the vehicle 10 (S405). Since the control device 300 does not receive the engine start permission signal, the control device 300 does not perform the engine start permission control of putting the engine ECU 305 into the engine start allowing state.

As described above, when the function restriction information is added to the authentication information that is transmitted from the third-party terminal 200b to the key unit 100 of the vehicle control device 11, the engine ECU 305 is not put into the engine start allowing state. Therefore, the third party possessing the third-party terminal 200b cannot start the engine 13 of the vehicle 10, although the third party can lock and unlock the door of the vehicle 10. That is, the third party cannot drive the vehicle 10 using the third-party terminal 200b.

In this way, when the function restriction information is added to the authentication information that is transferred from the user terminal 200a to the third-party terminal 200b, it is possible to restrict the control that is allowed to be performed to the vehicle 10 by the vehicle control device 11 when the authentication information is transmitted from the third-party terminal 200b to the vehicle control device 11. That is, it is possible to restrict the control that the third party is allowed to perform to the vehicle 10 using the third-party terminal 200b. In the above description, the control that is restricted by adding the function restriction information to the authentication information is the engine start permission control, but another control that is allowed to be performed when the vehicle control device 11 receives the authentication information from the portable terminal may be restricted.

First Modification

In the second embodiment, the server device 400 adds the function restriction information to the authentication information for lending, based on the demand that is transmitted from the user terminal 200a. Then, the authentication information to which the function restriction information has been added is transmitted from the server device 400 to the user terminal 200a. However, the addition of the function restriction information to the authentication information for lending may be performed on the user terminal 200a side. Also in this case, the authentication information for lending to which the transfer allowing information has been added is transmitted from the server device 400 to the user terminal 200a, in response to the request transmitted from the user terminal 200a. Then, the function restriction information is added to the authentication information for lending in the user terminal 200a, in response to an input operation performed to the operation screen 2040 of the user terminal 200a shown in FIG. 6 by the user. The addition of the function restriction information to the authentication information for lending is performed by the control unit 203. Then, similarly to the second embodiment, the user terminal 200a transmits the authentication information to which the function restriction information has been added, to the third-party terminal 200b. Also in this case, similarly to the second embodiment, it is possible to restrict the control that the third party is allowed to perform to the vehicle 10 using the third-party terminal 200b.

Second Modification

The addition of the function restriction information to the authentication information for lending does not always need to be performed based on the demand from the user. That is, the server device 400 may automatically add, to the authentication information, the function restriction information in which the function restriction content is previously determined, while adding the transfer allowing information, when the server device 400 delivers the authentication information for lending.

Third Embodiment

The overview of the key system according to the embodiment is the same as that according to the first embodiment. In the embodiment, it is possible to restrict a period or region in which the third party is allowed to utilize the vehicle using the third-party terminal. For the embodiment, different points from the first embodiment will be mainly described below.

Operation of User Terminal

When the user shares the vehicle 10 with the third party or lends the vehicle 10 to the third party, the user sometimes restricts the period or region in which the third party is allowed to utilize the vehicle 10. In the embodiment, in such a case, the user demands to add use restriction information (fourth information) to the authentication information for lending, at the time when the user requests the delivery of the authentication information for lending to the server device 400. Here, the use restriction information may be period restriction information for restricting the period in which the third party is allowed to utilize the vehicle 10, or may be region restriction information for restricting the region in which the third party is allowed to utilize the vehicle 10. Further, the use restriction information may contain both the period restriction information and the region restriction information.

Figure 10:
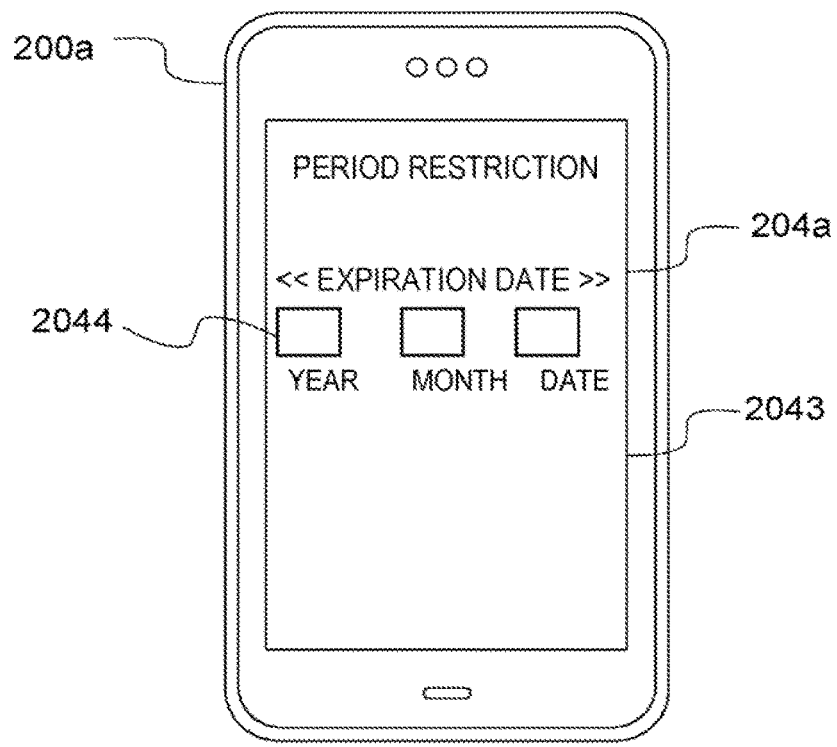
FIG. 10 is a first diagram showing an operation screen of a touch panel display included in an input-output unit of a user terminal according to a third embodiment.
Figure 11:
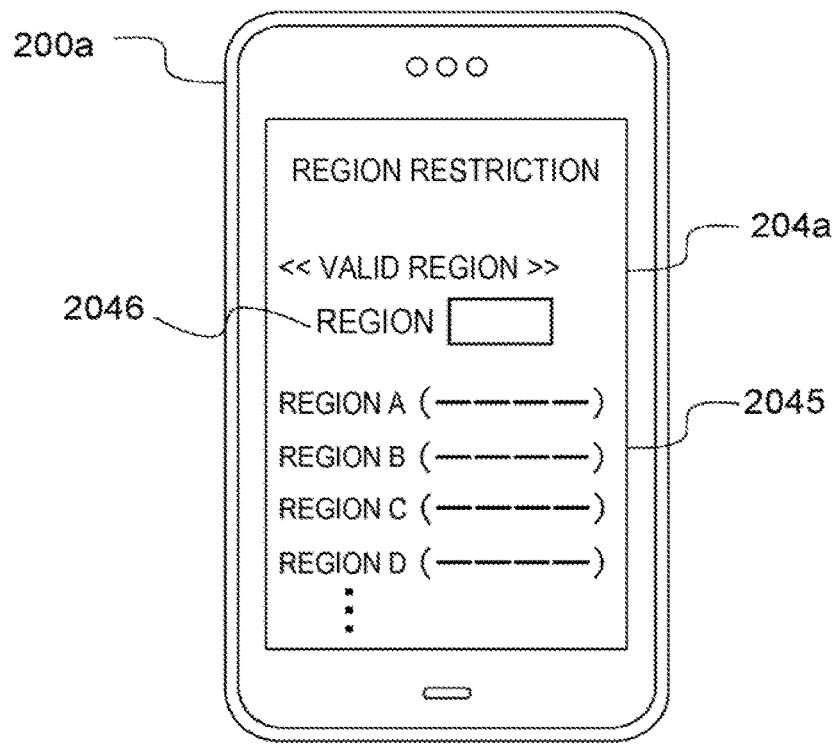
FIG. 11 is a second diagram showing an operation screen of the touch panel display included in the input-output unit of the user terminal according to the third embodiment.

FIG. 10 and FIG. 11 are diagrams showing operation screens of a touch panel display that is included in an input-output unit 204a of a user terminal 200a and that is operated when the user requests the delivery of the authentication information for lending to the server device 400. FIG. 10 shows an operation screen 2043 when the user demands the addition of the period restriction information as the use restriction information. The operation screen 2043 contains an operation button (UI element) 2044 for inputting an expiration date. The expiration date to be input here is a time limit by which the authentication information can be validly used by the third-party terminal 200b after the authentication information is transferred from the user terminal 200a to the third-party terminal 200b. A valid use period about the authentication information for lending that is restricted by the period restriction information is set based on the expiration date input on the operation screen 2043. That is, the period restriction information is information that restricts the use period in which the third-party terminal 200b is allowed to validly use the authentication information. A valid use period about the authentication information for lending may be directly input on the operation screen 2043, instead of the expiration date about the authentication information for lending. Further, the number of times of use in which the third-party terminal 200b is allowed to validly use the authentication information may be restricted instead of the use period in which the third-party terminal 200b is allowed to validly use the authentication information.

FIG. 11 shows an operation screen 2045 when the user demands the addition of the region restriction information as the use restriction information. The operation screen 2045 contains an operation button (UI element) 2046 for inputting a valid region. On the operation screen 2045, the valid region is input by being selected from a plurality of regions (regions A, B, C, D, . . . ) previously set. The input method for the valid region is not limited to such a method, and for example, the valid region may be set on a map that is displayed on the screen. The valid use region about the authentication information for lending that is restricted by the region restriction information is set based on the valid region input on the operation screen 2045. That is, the region restriction information is information that restricts the region in which the third-party terminal 200b is allowed to validly use the authentication information.

Sharing of Authentication Information

Figure 12:
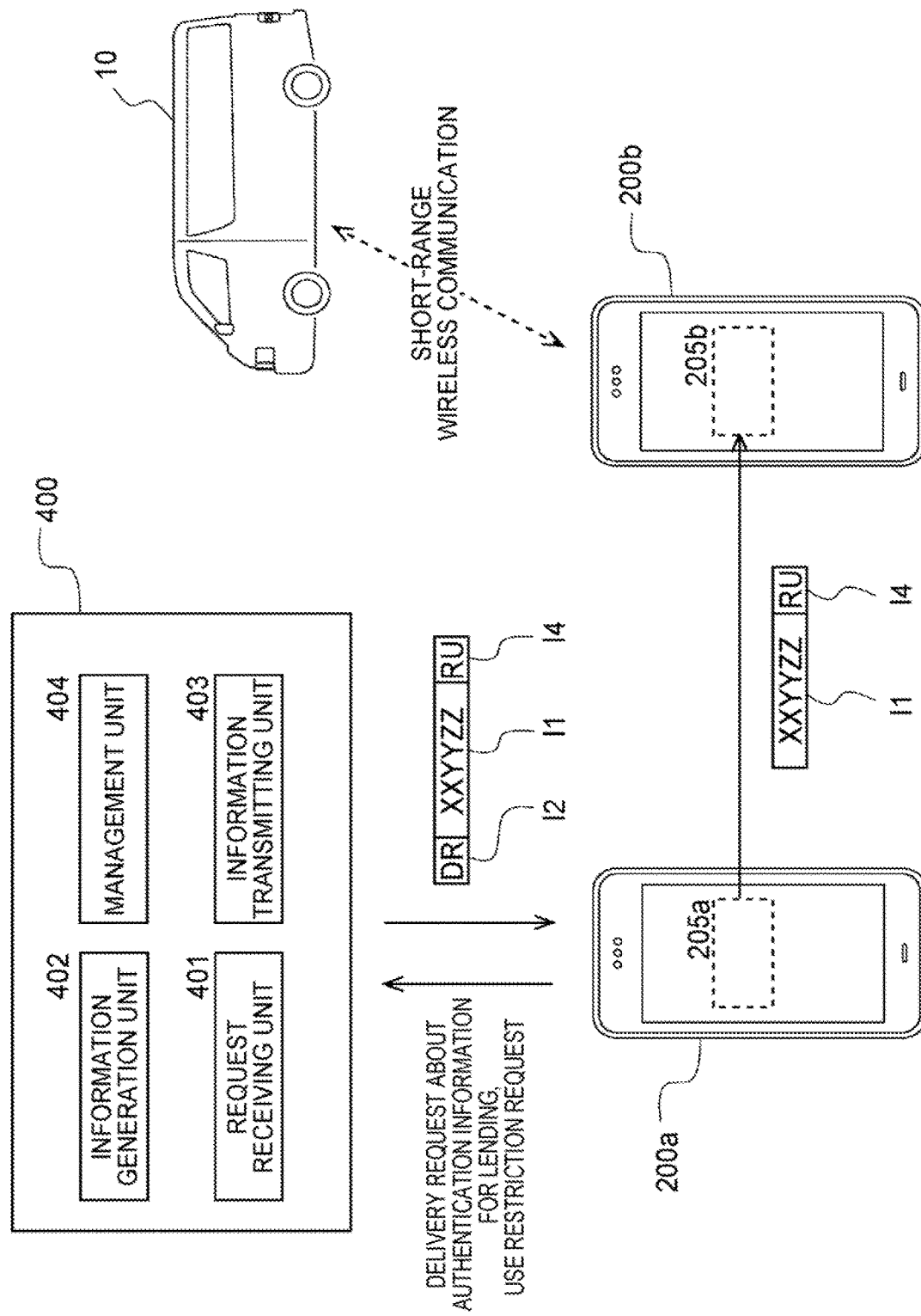
FIG. 12 is a diagram for describing a transfer of the authentication information from the user terminal to the third-party terminal according to the third embodiment.
Figure 13:
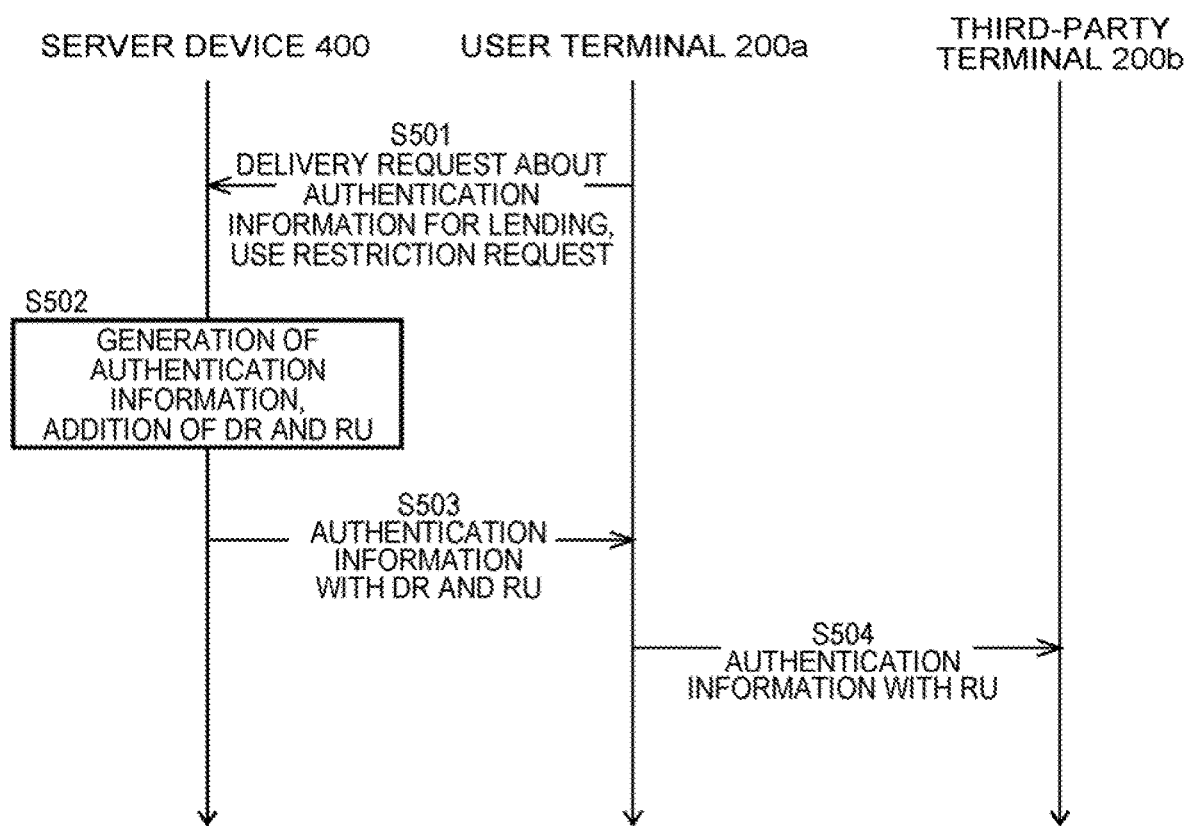
FIG. 13 is a diagram showing a flow of processes and data when the authentication information is transferred from the user terminal to the third-party terminal according to the third embodiment.

FIG. 12 is a diagram for describing a transfer of the authentication information from the user terminal 200a to the third-party terminal 200b in the key system according to the embodiment in the case where the user provides the restriction about the utilization of the vehicle 10 by the third party (that is, in the case where the expiration date is input on the operation screen 2043 of the user terminal 200a shown in FIG. 10 and/or in the case where the valid region is input on the operation screen 2045 of the user terminal 200a shown in FIG. 11). FIG. 13 is a diagram showing a flow of processes and data when the authentication information is transferred from the user terminal 200a to the third-party terminal 200b in that case.

In the case where the user inputs the expiration date on the operation screen 2043 and/or in the case where the user inputs the valid region on the operation screen 2045, the user terminal 200a transmits the user restriction request about the authentication information for lending to the server device 400, together with the delivery request about the authentication information for lending (S501 in FIG. 13). In the server device 400, when the request receiving unit 401 receives the requests, the information generation unit 402 generates the authentication information I1 associated with the vehicle 10. Furthermore, the information generation unit 402 adds the use restriction information (RU) I4 to the authentication information I1, together with the transfer allowing information (DR) I2 (S502 in FIG. 13).

At this time, the use restriction information I4 is generated based on the use restriction request received from the user terminal 200a. That is, a restriction content to be restricted by the use restriction information I4 is set depending on a request content of the use restriction request. Here, since the expiration date is input on the operation screen 2043 of the user terminal 200a shown in FIG. 10 and/or the valid region is input on the operation screen 2045 of the user terminal 200a shown in FIG. 11, the use restriction request is transmitted from the user terminal 200a. That is, in this use restriction request, the user requests that the valid use period and/or valid use region set as described above be provided about the authentication information for lending. Therefore, the use restriction information I4 is generated based on the valid use period and/or valid use region set as described above.

Then, the information transmitting unit 403 of the server device 400 transmits the authentication information I1 to which the transfer allowing information I2 and the use restriction information I4 have been added, to the user terminal 200a (S503 in FIG. 13). When the user terminal 200a receives the authentication information I1 to which the transfer allowing information I2 and the use restriction information I4 have been added, the user terminal 200a transmits the authentication information I1 to which the use restriction information I4 has been added, to the third-party terminal 200b through the terminal-to-terminal communication unit 205a, in response to the input operation by the user (S504 in FIG. 13). The third-party terminal 200b stores the authentication information I1 to which the use restriction information I4 has been added and that has been received from the user terminal 200a through the terminal-to-terminal communication unit 205b, in the storage unit included in the control unit 203.

Behavior of Key System

When the third-party terminal 200b receives the authentication information to which the use restriction information has been added, the third party is allowed to utilize the vehicle 10 using the third-party terminal 200b. That is, by transmitting the authentication information from the third-party terminal 200b to the vehicle control device 11 of the vehicle 10 together with the control request, it is possible to make the vehicle control device 11 perform a control corresponding to the control request.

However, in the case where the use restriction information contains the period restriction information, the authentication information stored in the control unit 203 of the third-party terminal 200b expires when the set valid use period elapses. Therefore, when the valid use period elapses, the third party is not allowed to utilize the vehicle 10 using the third-party terminal 200b. The third-party terminal 200b may notify the third party of the elapse of the set valid use period, before the valid use period elapses. Further, in the case where the use restriction information contains the information that restricts the number of times of use in which the authentication information is allowed to be validly used, the authentication information stored in the control unit 203 of the third-party terminal 200b expires when the authentication information is transmitted from the third-party terminal 200b to the vehicle control device of the vehicle 10 to the number of times of valid use set.

Further, in the case where the use restriction information contains the region restriction information, the third-party terminal 200b is not allowed to transmit the authentication information to the vehicle control device 11, when the third party possessing the third-party terminal 200b drives to move the vehicle 10 to a place outside the set valid use region. Therefore, in the place outside the valid use region, the third party is not allowed to utilize the vehicle 10 using the third-party terminal 200b. The position of the third-party terminal 200b can be acquired by a positional information acquiring device such as a GPS that is mounted on the third-party terminal 200b or the vehicle 10. Then, whether the third-party terminal 200b and the vehicle 10 exist in the valid use region can be determined based on the acquired positional information. When the third-party terminal 200b and the vehicle 10 are expected to move to the place outside the valid use region or have moved to the place outside the valid use region, the third-party terminal 200b may notify the third party of that effect.

As described above, it is possible to restrict the use of the authentication information by the third-party terminal 200b, by adding the use restriction information to the authentication information that is transferred from the user terminal 200a to the third-party terminal 200b. That is, it is possible to provide the restriction about the utilization of the vehicle 10 when the third party transmits the authentication information from the third-party terminal 200b to the vehicle control device 11.

First Modification

Together with the use restriction information, the function restriction information described in the second embodiment may be added to the authentication information that is transferred from the user terminal 200a to the third-party terminal 200b.

Second Modification

In the second embodiment, the server device 400 adds the use restriction information to the authentication information for lending, based on the demand that is transmitted from the user terminal 200a. Then, the server device 400 transmits the authentication information to which the use restriction information has been added, to the user terminal 200a. However, the addition of the use restriction information to the authentication information for lending may be performed on the user terminal 200a side. Also in this case, the server device 400 transmits the authentication information for lending to which the transfer allowing information has been added, to the user terminal 200a, in response to the request that is transmitted from the user terminal 200a. Then, in the user terminal 200a, the use restriction information is added to the authentication information, in response to the input operation performed by the user on the operation screens 2043, 2045 of the user terminal 200a shown in FIG. 10 and/or FIG. 11. The addition of the use restriction information to the authentication information is performed by the control unit 203. Then, similarly to the third embodiment, the user terminal 200a transmits the authentication information to which the use restriction information has been added, to the third-party terminal 200b. Also in this case, similarly to the third embodiment, it is possible to provide the restriction about the utilization of the vehicle 10 when the third party transmits the authentication information from the third-party terminal 200b to the vehicle control device 11.

Third Modification

The addition of the use restriction information to the authentication information for lending does not always need to be performed based on the demand from the user. That is, the server device 400 may automatically add, to the authentication information, the use restriction information in which the use restriction content is previously determined, while adding the transfer allowing information, when the server device 400 delivers the authentication information for lending.

Fourth Embodiment

The overview of the key system according to the embodiment is the same as that according to the first embodiment. In the embodiment, it is possible to restrict the range of the third party with which the user shares the authentication information, by restricting the third-party terminal as a destination to which the authentication information is transmitted from the user terminal, only to a particular third-party terminal belonging to a particular group. For the embodiment, different points from the first embodiment will be mainly described below.

Operation of User Terminal

By restricting the third-party terminal to which the authentication information is allowed to be transmitted from the user terminal, only to the particular third-party terminal, it is possible to avoid the authentication information from being transmitted to a terminal to which the user does not intend to transmit the authentication information. Hence, in the embodiment, the user demands to add sharer restriction information (fifth information) to the authentication information for lending, at the time when the user requests the delivery of the authentication information for lending to the server device 400.

Figure 14:
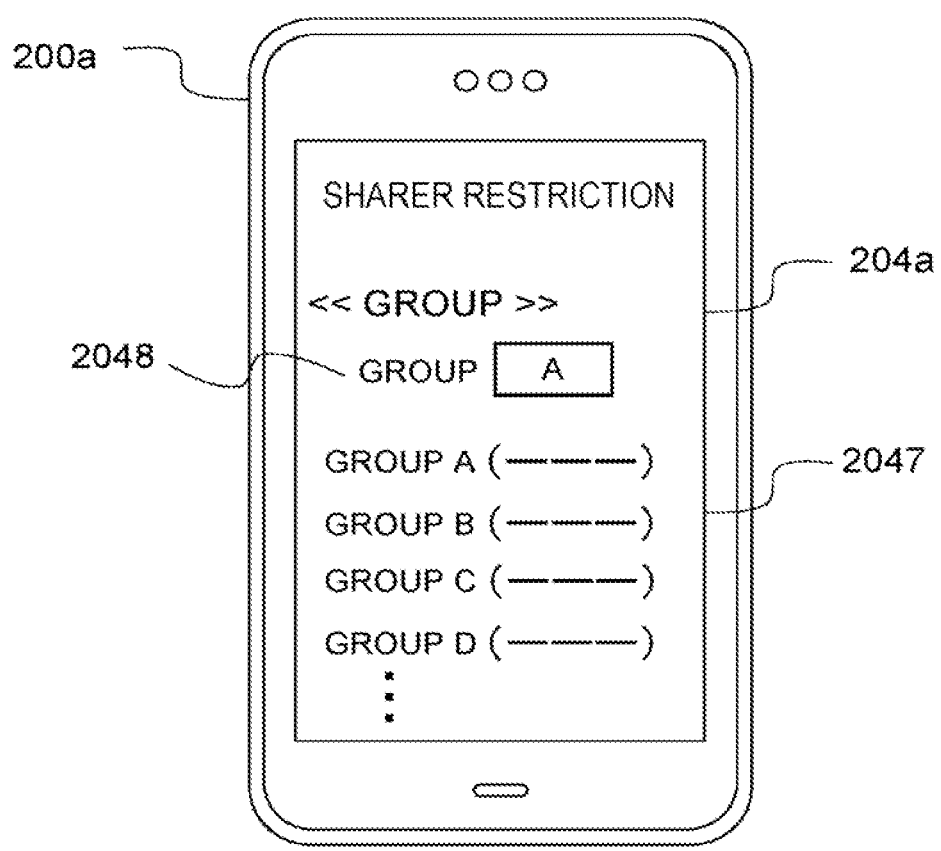
FIG. 14 is a diagram showing an operation screen of a touch panel display included in an input-output unit of a user terminal according to a fourth embodiment.

FIG. 14 is a diagram showing an operation screen 2047 of a touch panel display that is included in an input-output unit 204a of a user terminal 200a and that is operated when the user requests the delivery of the authentication information for lending to the server device 400. The operation screen 2047 includes an operation button (U1 element) 2048 for inputting a group with which the authentication information is shared. On the operation screen 2047, a particular group is input by being selected from a plurality of groups (groups A, B, C, D, . . . ) previously set. Here, in the user terminal 200a, a plurality of candidates that can be a sharer of the authentication information is registered in a registration unit included in the control unit 203, while being grouped into the plurality of groups (groups A, B, C, D, . . . ). That is, the plurality of third-party terminals corresponding to the candidates is registered while being grouped into the plurality of groups. In the embodiment, the registration unit included in the control unit 203 corresponds to the "registration unit". On the operation screen 2047, the particular group is selected from the plurality of groups registered in the registration unit of the control unit 203. FIG. 14 illustrates a state in which the group A has been selected as the particular group. The setting method for the particular group is not limited to such a method, and for example, the particular group may be set by selecting a candidate from a name list (an address book or the like) in a predetermined application included in the user terminal 200a.

Sharing of Authentication Information

Figure 15:
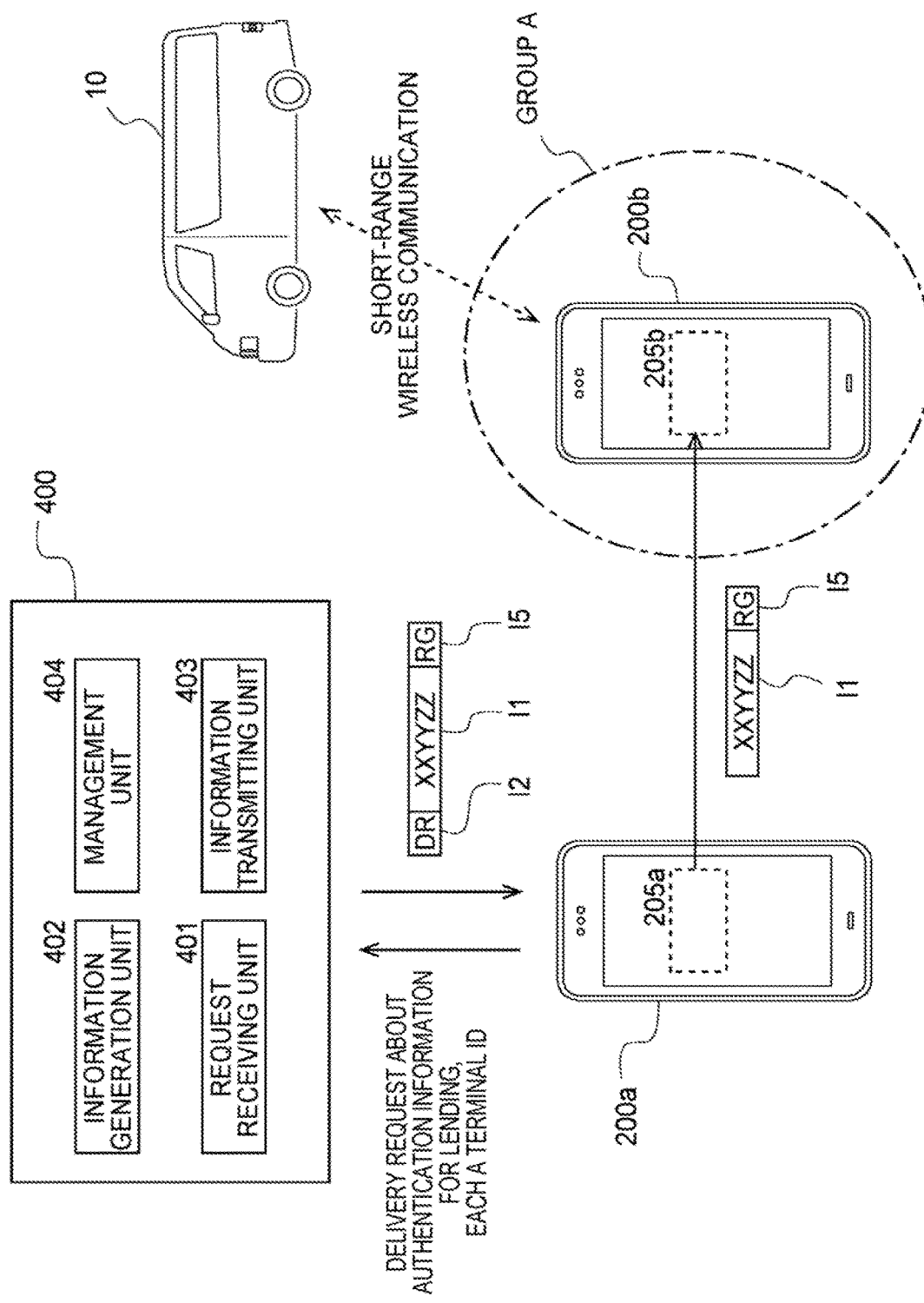
FIG. 15 is a diagram for describing a transfer of the authentication information from the user terminal to the third-party terminal according to the fourth embodiment.
Figure 16:
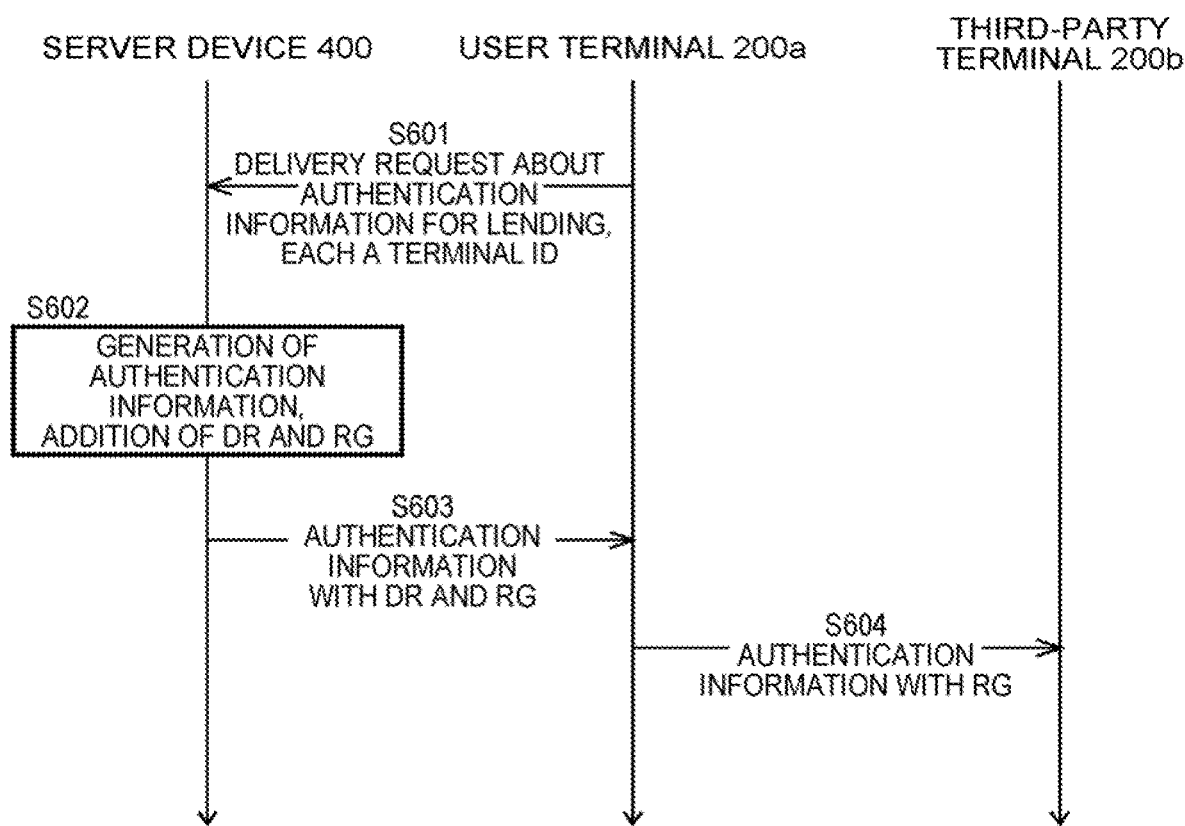
FIG. 16 is a diagram showing a flow of processes and data when the authentication information is transferred from the user terminal to the third-party terminal according to the fourth embodiment.

FIG. 15 is a diagram for describing a transfer of the authentication information from the user terminal 200a to the third-party terminal 200b in the key system according to the embodiment in the case where the user restricts the sharer of the authentication information only to the particular third-party terminal belonging to the particular group (that is, in the case where the user inputs the particular group on the operation screen 2047 of the user terminal 200a shown in FIG. 14). FIG. 16 is a diagram showing a flow of processes and data when the authentication information is transferred from the user terminal 200a to the third-party terminal 200b in that case. In the following description, it is assumed that the group A is selected as the particular group on the operation screen 2047 of the user terminal 200a shown in FIG. 14.

In the case where the user inputs the particular group (the group A is selected in this example) on the operation screen 2047, the user terminal 200a transmits information about each particular third-particular terminal belonging to the group A selected as the particular group (hereinafter, also referred to as "A terminal ID"), to the server device 400, together with the delivery request about the authentication information for lending (S601 in FIG. 16). In the server device 400, when the request receiving unit 401 receives the delivery request about the authentication information for lending and the A terminal ID, the information generation unit 402 generates the authentication information I1 associated with the vehicle 10. Furthermore, the information generation unit 402 adds sharer restriction information (RG) I5 to the authentication information I1, together with the transfer allowing information (DR) I2 (S602 in FIG. 16). The sharer restriction information I5 to be added at this time is information that is generated in association with the A terminal ID received from the user terminal 200*a*.

Then, the information transmitting unit 403 of the server device 400 transmits the authentication information I1 to which the transfer allowing information I2 and the sharer restriction information I5 have been added, to the user terminal 200*a* (S603 in FIG. 16). Since the user terminal 200*a* receives the authentication information I1 to which the sharer restriction information I5 has been added, the destination to which the authentication information I1 is allowed to be transmitted is restricted only to the particular third-party terminal belonging to the group A. That is, when the user terminal 200*a* receives the authentication information I1 to which the sharer restriction information I5 has been added, the user terminal 200*a* is not allowed to transmit the authentication information I1 to the third-party terminal not belonging to the group A, even when the transfer allowing information I2 has been added to the authentication information I1. Then, in response to the input operation by the user, the user terminal 200*a* transmits the authentication information I1 to which the sharer restriction information I5 has been added, to the third-party terminal 200*b* belonging to the group A, through the terminal-to-terminal communication unit 205*a* (S604 in FIG. 16). The third-party terminal not belonging to the group A may be configured such that when the user terminal 200*a* transmits the authentication information I1 to which the sharer restriction information I5 has been added, the third-party terminal not belonging to the group A cannot receive the authentication information I1.

First Modification

The function restriction information described in the second embodiment and/or the use restriction information described in the third embodiment may be added to the authentication information that is transferred from the user terminal 200*a* to the third-party terminal 200*b* belonging to the particular group.

Second Modification

In the fourth embodiment, the server device 400 adds the sharer restriction information to the authentication information for lending, based on the demand that is transmitted from the user terminal 200*a*. Then, the server device 400 transmits the authentication information to which the sharer restriction information has been added, to the user terminal 200*a*. However, the addition of the sharer restriction information to the authentication information for lending may be performed on the user terminal 200*a* side. Also in this case, the server device 400 transmits the authentication information for lending to which the transfer allowing information has been added, to the user terminal 200*a*, in response to the request that is transmitted from the user terminal 200*a*. Then, in the user terminal 200*a*, the sharer restriction information is added to the authentication information, in response to the input operation performed by the user on the operation screen 2047 of the user terminal 200*a* shown in FIG. 14. The addition of the sharer restriction information to the authentication information is performed by the control unit 203. Also in this case, similarly to the fourth embodiment, it is possible to restrict the third-party terminal 200*b* to which the authentication information is allowed to be transmitted from the user terminal 200*a*, only to the particular third-party terminal.

Third Modification

The addition of the sharer restriction information to the authentication information for lending does not always need to be performed based on the demand from the user. That is, the server device 400 may automatically add, to the authentication information, the sharer restriction information in which the particular third-party terminal is previously determined, while adding the transfer allowing information, when the server device 400 delivers the authentication information for lending.

Fifth Embodiment

The overview of the key system according to the embodiment is the same as that according to the first embodiment. In the embodiment, similarly to the fourth embodiment, in the user terminal 200*a*, a plurality of candidates that can be a sharer of the authentication information is registered in a registration unit included in the control unit 203, while being grouped into a plurality of groups. Further, in the key system according to the embodiment, similarly to the second embodiment, the function restriction information can be added to the authentication information that is transferred from the user terminal 200*a* to the third-party terminal 200*b*. Furthermore, in the key system according to the embodiment, similarly to the third embodiment, the use restriction information can be added to the authentication information that is transferred from the user terminal 200*a* to the third-party terminal 200*b*.

In the embodiment, when the authentication information is shared by the user terminal 200*a* and the third-party terminal 200*b*, the restriction content for the function restriction information and/or use restriction information to be added to the authentication information is set for each of the above-described groups (the groups constituted by a plurality of the third-party terminals) registered in the registration unit included in the control unit 203 of the user terminal 200*a*. Specifically, the user terminal 200*a* sets the restriction content in the function restriction request for each of the groups. Then, when the user terminal 200*a* transmits the delivery request about the authentication information for lending to the server device 400, the user terminal 200*a* transmits together the function restriction request corresponding to a group to which the third-party terminal as the destination of the authentication information for lending belongs. Thereby, in the server device 400, the function restriction information corresponding to the function restriction request set for each of the groups is added to the authentication information for lending.

Further, the user terminal 200*a* sets the restriction content in the use restriction request for each of the groups. Then, when the user terminal 200*a* transmits the delivery request about the authentication information for lending to the server device 400, the user terminal 200a transmits together the use restriction request corresponding to the group to which the third-party terminal as the destination of the authentication information for lending belongs. Thereby, in the server device 400, the use restriction information corresponding to the use restriction request set for each of the groups is added to the authentication information for lending.

As described above, it is possible to transmit, to the third-party terminal, the authentication information to which the function restriction information and/or use restriction information with the restriction content corresponding to the group to which the third-party terminal as the sharer of the authentication information belongs have been added.

Modification

Also in the case of adding, to the authentication information for lending, the function restriction information and/or use restriction information with the restriction content corresponding to the group to which the third-party terminal as the sharer of the authentication information belongs as described in the fifth embodiment, the addition of the function restriction information and/or use restriction information to the authentication information for lending may be performed on the user terminal 200a side, instead of the server device 400 side.

Other Embodiments

In the above description, the object to be controlled when the authentication information is transmitted from the portable terminal to the control device is a vehicle. However, the above system can be applied to an object other than the vehicle, for example, a facility (including a building and a house), an airplane, a ship and the like. By applying the above system, the user terminal and the third-party terminal can share the authentication information for making a control device equipped in the object other than the vehicle perform a predetermined control to the object.

In the above description, the information generation unit further adds the third information that is the information for restricting the predetermined control that is allowed to be performed to the object when the control device receives the first information, to the first information, when the information generation unit adds the second information to the first information. However, the third information to be added to the first information by the information generation unit may be information for additionally permitting a predetermined control that is allowed to be performed to the object when the control device receives the first information. Thereby, the predetermined control that is allowed to be performed to the object by the control device when the third-party terminal transmits the first information to the control device is additionally permitted. Accordingly, it is possible to additionally permit the predetermined control that is allowed to be performed to the object by the control device, when the third party utilizes the object using the third-party terminal. This modification is effective in the case where the predetermined control is previously restricted.

In the above case, the information generation unit may set a content that is included in the third information and that is additionally permitted in the predetermined control, based on a function permission request that is transmitted from the user terminal to the delivery device, and may add the third information to the first information. Thereby, when the user sets the content of the function permission request that is delivered from the user terminal to the delivery device, the user can determine the content to be additionally permitted in the predetermined control that is allowed to be performed to the object by the control device when the third party transmits the first information from the third-party terminal to the control device.

In the above case, the user terminal may further include a registration unit configured to register a plurality of the third-party terminals while grouping the plurality of the third-party terminals into a plurality of groups, and the user terminal may set the permission content in the function permission request for each of the groups and may transmit the function permission request to the delivery device. In this case, the information generation unit may add the third information corresponding to the function permission request set for each of the groups, to the first information. Thereby, for each of the groups, the user can set the content to be additionally permitted in the predetermined control that is allowed to be performed to the object by the control device when the first information is transmitted from the third-party terminal to the control device.

In the above description, the information generation unit further adds the fourth information that is information for restricting the use of the first information by the third-party terminal, to the first information, when the information generation unit adds the second information to the first information. However, the information generation unit may further add the fourth information that is information for additionally permitting the use of the first information by the third-party terminal, to the first information, when the information generation unit adds the second information to the first information. Then, when the user terminal receives the first information to which the second information and the fourth information have been added, from the delivery device, the user terminal may transmit the first information to which the fourth information has been added, from the terminal-to-terminal communication unit to the third-party terminal. Thereby, the third-party terminal receives the first information to which the fourth information has been added. Accordingly, it is possible to provide the additional permission about the utilization of the object when the third party transmits the first information from the third-party terminal to the control device.

In the above case, the information generation unit may set a content that is included in the fourth information and that is additionally permitted in the first information, based on a use permission request that is transmitted from the user terminal to the delivery device, and may add the fourth information to the first information. Thereby, when the user sets the content of the use permission request that is delivered from the user terminal to the delivery device, the user can determine the content to be additionally permitted about the utilization of the object when the third party transmits the first information from the third-party terminal to the control device.

Here, the fourth information may contain information for permitting the use period or the number of times of use in which the third-party terminal is allowed to validly use the first information. When the third-party terminal receives the first information to which the fourth information has been added, the third-party terminal transmits the first information to the control device, and thereby, the period or the number of times in which the control device is allowed to perform the predetermined control to the object is permitted. Accordingly, it is possible to additionally permit the period or the number of times in which the third party is allowed to utilize the object. Further, in the case where the object is a movable body such as a vehicle, the fourth information may contain information for permitting the region in which the third-party terminal is allowed to validly use the first information. When the third-party terminal receives the first information to which the fourth information has been added, the region in which the control device is allowed to perform the predetermined control to the movable body (object) when the first information is transmitted from the third-party terminal to the control device is additionally permitted. Accordingly, it is possible to additionally restrict the region in which the third party is allowed to utilize the movable body (object).

When the user terminal further includes the registration unit configured to register the plurality of third-party terminals while grouping the plurality of third-party terminals into the plurality of groups, the user terminal may set the permission content in the use permission request for each of the groups, and may transmit the use permission request to the delivery device. In this case, in the delivery device, the information generation unit adds the fourth information corresponding to the use permission request set for each of the groups, to the first information. Thereby, for each of the groups, the user can set the permission content about the utilization of the object when the third party transmits the first information from the third-party terminal to the control device.

For example, in the case where the object is a facility, by transmitting the authentication information from the portable terminal to the control device equipped in the facility, it is possible to make the control device perform a locking-unlocking control of locking or unlocking a door of the facility, an electric power source turning-on control of turning on an electric power source of an electric product in the facility, or the like. At this time, similarly to the second embodiment, by adding function restriction information for restricting the electric power source turning-on control to the authentication information that is transferred from the user terminal to the third-party terminal, it is possible to allow the third party to lock and unlock the door of the facility using the third-party terminal, but allow the third party not to utilize the electric product in the facility. Further, in the case where the authentication information that is transferred from the user terminal to the third-party terminal contains only authentication information for locking and unlocking the door of the facility in advance, by adding function permission information for permitting the electric power source turning-on control of turning on the electric power source of the electric product in the facility to the authentication information that is transferred from the user terminal to the third-party terminal, the third party is allowed to lock and unlock the door of the facility and utilize the electric product in the facility, using the third-party terminal.

What is claimed is:

1. A key information sharing system that allows key information as first information to be shared, the first information being associated with an object equipped with a control device, the control device performing a predetermined control to the object when the control device receives the first information from an external terminal, the key information sharing system comprising:
   a server configured to deliver the first information; and
   a first portable terminal possessed by a user, the first portable terminal configured to receive the first information delivered from the server, wherein
   the server includes a processor configured to add second information to the first information that is delivered to the first portable terminal, the second information being information that allows the first information to be transferred between the first portable terminal and a second portable terminal possessed by a third-party without the server,
   the first portable terminal includes a terminal-to-terminal communication interface circuit configured to transmit the first information to the second portable terminal in response to an input operation by the user, when the first portable terminal receives the first information to which the second information has been added, from the server,
   the processor of the server sets a restriction content for the predetermined control, based on a function restriction request transmitted from the first portable terminal to the server, and adds third information to the first information, the restriction content being contained in the third information,
   the processor of the server further adds fifth information to the first information when the processor of the server adds the second information to the first information, the fifth information being information that allows the first information to be transferred only between the first portable terminal and a particular second portable terminal belonging to a particular group without the server; and
   the first portable terminal transmits the first information only to the particular second portable terminal, when the first portable terminal receives the first information to which the second information and the fifth information have been added, from the server.

2. The key information sharing system according to claim 1, wherein:
   the processor of the server further adds the third information to the first information when the processor of the server adds the second information to the first information, the third information being information that restricts the predetermined control that is allowed to be performed to the object when the control device receives the first information; and
   the first portable terminal transmits the first information to which the third information has been added from the terminal-to-terminal communication interface circuit to the particular second portable terminal, when the first portable terminal receives the first information to which the second information, the third information, and the fifth information have been added, from the server.

3. The key information sharing system according to claim 1, wherein:
   the processor of the server further adds fourth information to the first information when the processor of the server adds the second information to the first information, the fourth information being information that restricts use of the first information by the particular second portable terminal; and
   the first portable terminal transmits the first information to which the fourth information has been added from the terminal-to-terminal communication interface circuit to the particular second portable terminal, when the first portable terminal receives the first information to which the second information, the fourth information, and the fifth information have been added, from the server.

4. The key information sharing system according to claim 3, wherein the processor of the server sets a restriction content for the first information, based on a use restriction request transmitted from the first portable terminal to the server, and adds the fourth information to the first information, the restriction content being contained in the fourth information.

5. The key information sharing system according to claim 4, wherein:
the first portable terminal further includes a processor configured to register a plurality of second portable terminals while grouping the plurality of the second portable terminals into a plurality of groups, and the first portable terminal sets the restriction content in the use restriction request for each of the groups and transmits the use restriction request to the server; and
the processor of the server adds the fourth information corresponding to the use restriction request set for each of the groups, to the first information.

6. The key information sharing system according to claim 3, wherein the fourth information contains information that restricts a use period or a number of times of use in which the second portable terminal is allowed to validly use the first information.

7. The key information sharing system according to claim 3, wherein:
the object is a movable body; and
the fourth information contains information that restricts a region in which the second portable terminal is allowed to validly use the first information.

8. The key information sharing system according to claim 1, wherein the processor of the server generates the fifth information based on information about the particular second portable terminal that is transmitted from the first portable terminal to the server, and adds the fifth information to the first information.

9. The key information sharing system according to claim 1, wherein:
the first portable terminal further includes a processor configured to register a plurality of second portable terminals while grouping the plurality of the second portable terminals into a plurality of groups, and the first portable terminal sets the restriction content in the function restriction request for each of the groups and transmits the function restriction request to the server; and
the processor of the server adds the third information corresponding to the function restriction request set for each of the groups, to the first information.

10. The key information sharing system according to claim 1, wherein the first portable terminal transmits the first information to which the third information has been added, to the particular second portable terminal, when the first portable terminal receives the first information to which the second information and fifth information have been added, from the server, the third information being information that restricts the predetermined control that is allowed to be performed to the object when the control device receives the first information.

11. The key information sharing system according to claim 10, wherein the first portable terminal includes a processor configured to register a plurality of second portable terminals while grouping the plurality of the second portable terminals into a plurality of groups, and the first portable terminal sets a restriction content that is contained in the third information, for each of the groups.

12. The key information sharing system according to claim 1, wherein the first portable terminal adds fourth information to the first information, and transmits the first information to which the fourth information has been added, to the particular second portable terminal, when the first portable terminal receives the first information to which the second information and the fifth information have been added, from the server, the fourth information being information that restricts use of the first information in the control device.

13. The key information sharing system according to claim 12, wherein the first portable terminal includes a processor configured to register a plurality of second portable terminals while grouping the plurality of the second portable terminals into a plurality of groups, and the first terminal sets a restriction content that is contained in the fourth information, for each of the groups.

14. The key information sharing system according to claim 1, wherein:
the object is a vehicle; and
the predetermined control includes a locking-unlocking control for the vehicle and a control of putting a driving source of the vehicle into a drivable state.

15. A delivery device comprising:
information transmitting circuitry configured to deliver key information as first information to a first portable terminal possessed by a user, the first information being associated with an object equipped with a control device, the control device performing a predetermined control to the object when the control device receives the first information from an external terminal; and
a processor configured to add second information to the first information that is delivered to the first portable terminal, the second information being information that allows the first information to be transferred between the first portable terminal and a second portable terminal possessed by a third-party without the delivery device, wherein
the processor sets a restriction content for the predetermined control, based on a function restriction request transmitted from the first portable terminal, and adds third information to the first information, the restriction content being contained in the third information,
the processor further adds fourth information to the first information when the processor adds the second information to the first information, the fourth information being information that restricts use of the first information by the second portable terminal,
the object is a movable body, and
the fourth information contains information that restricts a region in which the second portable terminal is allowed to validly use the first information.

16. The delivery device according to claim 15, wherein the processor further adds the third information to the first information when the processor adds the second information to the first information, the third information being information that restricts the predetermined control that is allowed to be performed to the object when the control device receives the first information.

17. The delivery device according to claim 15, wherein the processor sets a restriction content for the first information, based on a use restriction request transmitted from the first portable terminal, and adds the fourth information to the first information, the restriction content being contained in the fourth information.

18. The delivery device according to claim 15, wherein the fourth information contains information that restricts a use period or a number of times of use in which the second portable terminal is allowed to validly use the first information.

19. The delivery device according to claim 15, wherein the processor further adds fifth information to the first information when the processor adds the second information to the first information, the fifth information being information that allows the first information to be transferred only between the first portable terminal and a particular second portable terminal belonging to a particular group without the delivery device.

20. The delivery device according to claim 19, wherein the processor generates the fifth information based on information about the particular group that is transmitted form the first portable terminal, and adds the fifth information to the first information.

21. The delivery device according to claim 15, wherein:
   the movable body is a vehicle; and
   the predetermined control includes a locking-unlocking control for the vehicle and a control of putting a driving source of the vehicle into a drivable state.

22. A first portable terminal possessed by a user, the first portable terminal comprising a terminal-to-terminal communication interface circuit configured to transmit the first information to a second portable terminal in response to an input operation by the user, when the first portable terminal receives the first information to which the second information has been added, from the delivery device according to claim 15.

* * * * *